United States Patent
Mizusawa

(10) Patent No.: US 9,736,842 B2
(45) Date of Patent: Aug. 15, 2017

(54) COMMUNICATION CONTROL APPARATUS, COMMUNICATION CONTROL METHOD, RADIO COMMUNICATION SYSTEM AND TERMINAL APPARATUS FOR AN EXTENSION BAND ADDED TO THE COMPONENT CARRIER TO AN EXCESS FREQUENCY BAND EITHER ON AN UPPER SIDE OR ON A LOWER SIDE OF THE COMPONENT CARRIER

(71) Applicant: SONY CORPORATION, Tokyo (JP)

(72) Inventor: Nishiki Mizusawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/785,343

(22) PCT Filed: Feb. 13, 2014

(86) PCT No.: PCT/JP2014/053348
§ 371 (c)(1),
(2) Date: Oct. 18, 2015

(87) PCT Pub. No.: WO2014/174877
PCT Pub. Date: Oct. 30, 2014

(65) Prior Publication Data
US 2016/0095118 A1 Mar. 31, 2016

(30) Foreign Application Priority Data
Apr. 23, 2013 (JP) ................................. 2013-090285

(51) Int. Cl.
*H04W 72/00* (2009.01)
*H04W 72/04* (2009.01)
(Continued)

(52) U.S. Cl.
CPC ......... *H04W 72/0453* (2013.01); *H04J 11/00* (2013.01); *H04J 11/005* (2013.01);
(Continued)

(58) Field of Classification Search
CPC .......... H04W 72/0453; H04W 72/044; H04W 28/26; H04W 72/00; H04W 72/04; H04W 72/0406; H04W 16/14; H04W 28/08
(Continued)

(56) References Cited

U.S. PATENT DOCUMENTS

2012/0320854 A1* 12/2012 Sumasu ............... H04J 11/0056
370/329
2013/0195052 A1* 8/2013 Ahmadi ............ H04W 72/0453
370/329

FOREIGN PATENT DOCUMENTS

JP 2013-509843 A 3/2013
WO 2011/093093 A1 8/2011

OTHER PUBLICATIONS

ETSI TS 136 211 V10.0.0 (Jan. 2011) Technical Specification LTE, Evolved Universal Terrestrial Radio Access (E-UTRA), Physical channels and modulation (3GPP TS 36.211 version 10.0.0 Release 10), hereinafter TS136.211.*

(Continued)

*Primary Examiner* — Ronald Eisner
(74) *Attorney, Agent, or Firm* — Chip Law Group

(57) ABSTRACT

[Object] To utilize the extension band in the band-filling efficiently.
[Solution] There is provided a communication control apparatus including: a communication control unit that controls radio communication performed by one or more terminal apparatuses on a component carrier having a basic bandwidth. The communication control unit sets an extension (Continued)

band to be added to the component carrier only to an excess frequency band either on an upper side or a lower side of the component carrier.

18 Claims, 19 Drawing Sheets

(51) Int. Cl.
| | |
|---|---|
| *H04J 11/00* | (2006.01) |
| *H04L 5/14* | (2006.01) |
| *H04W 72/12* | (2009.01) |
| *H04W 74/08* | (2009.01) |
| *H04L 5/00* | (2006.01) |
| *H04W 88/02* | (2009.01) |

(52) U.S. Cl.
CPC .......... *H04J 11/0069* (2013.01); *H04L 5/006* (2013.01); *H04L 5/14* (2013.01); *H04W 72/1257* (2013.01); *H04W 72/1278* (2013.01); *H04W 74/0866* (2013.01); *H04L 5/001* (2013.01); *H04W 88/02* (2013.01)

(58) Field of Classification Search
USPC .................................. 455/63.1, 114.2, 278.1
See application file for complete search history.

(56) References Cited

OTHER PUBLICATIONS

3GPP; "3GPP TS 36.104 v11.4.0"; 3rd Generation Partnership Project; Technical Specification Group Radio Access Network—Evolved Universal Terrestrial Radio Access (E-UTRA)—Base Station (BS) radio transmission and reception ; Mar. 22, 2013; 134 pages; 3 GPP Organizational Partners (Release 11); Vaibonne, France.
KDDI; "Clarfcaton for the Scope of First Phase NCT", 3GPP TSG RAN WG1 Meeting #72; Jan. 28 to Feb. 1, 2013; 4 pages; St Julian's, Malta.
KDDI; "Views on Use Cases of New Carrier Type in Rel-12"; 3GPP TSG RAN WG1 Meeting #71; Nov. 12 to 16, 2012; pp. 1-7; New Orleans, USA.
Huawei, Hi Silicon; "On improved bandwidth scalability for CA enhancement"; 3GPP TSG-RAN WG4 Meeting #61; Nov. 14 to 18, 2011: 3 pages: San Francisco, USA.
AT&T; "NCT and Band Filling"; 3GPP TSG RAN WG1 Meeting #72; Jan. 28 to Feb. 1, 2013; pp. 1-3; St Julian's, Malta.

* cited by examiner

FIG.11

| ITEM | DATA CONTENT | SETTING PATTERN | | |
|---|---|---|---|---|
| | | ONE-SIDE | BOTH-SIDE TARGETED | ANY |
| EXTENSION DIRECTION | 0:UPPER SIDE, 1:LOWER SIDE, 2:BOTH-SIDE(SYMMETRIC), 3:BOTH-SIDE(ASYMMETRIC) | ◯ (0 or 1) | × | ◯ |
| BANDWIDTH 1 | NUMBER OF RBs CORRESPONDING TO EXTENSION BANDWIDTH | ◯ | ◯ | ◯ |
| BANDWIDTH 2 | NUMBER OF RBs CORRESPONDING TO EXTENSION BANDWIDTH (ONLY IN CASE OF BOTH-SIDE (ASYMMETRIC)) | × | × | ◯ |
| GUARD BANDWIDTH | NUMBER OF RBs CORRESPONDING TO GUARD BANDWIDTH OR NUMBER OF SUBCARRIERS | △ | △ | △ |
| CHANNEL ARRANGEMENT | ARRANGEMENT OF PRACH FOR NON-LEGACY TERMINAL, AND OTHERS | △ | △ | △ |

◯:NEEDED, ×:UNNEEDED, △:OPTIONAL

COMMUNICATION CONTROL APPARATUS, COMMUNICATION CONTROL METHOD, RADIO COMMUNICATION SYSTEM AND TERMINAL APPARATUS FOR AN EXTENSION BAND ADDED TO THE COMPONENT CARRIER TO AN EXCESS FREQUENCY BAND EITHER ON AN UPPER SIDE OR ON A LOWER SIDE OF THE COMPONENT CARRIER

TECHNICAL FIELD

The present disclosure relates to a communication control apparatus, a communication control method, a radio communication system and a terminal apparatus.

BACKGROUND ART

In long term evolution (LTE) that is a cellular communication scheme standardized in the third generation partnership project (3GPP), as a bandwidth used for radio communication, 6 alternatives of 1.4 MHz, 3 MHz, 5 MHz, 10 MHz, 15 MHz and 20 MHz are defined (see, for example, Non-Patent Literature 1). In LTE-advanced (LTE-A) obtained by developing the LTE, technology called carrier aggregation is further introduced, which allows a plurality of component carriers each having any bandwidth described above to be integrally used. For example, when the two component carriers each having a bandwidth of 20 MHz are simultaneously used, it is possible to form a radio channel of 40 MHz in total.

However, frequency bands assigned to communication providers in each country are not always adapted to the bandwidths defined in the LTE (hereinafter, a term of the LTE also includes the LTE-A). Therefore, when the communication providers operate an LTE system, an excess frequency band may remain as it is without being used. Then, a concept called band-filling has been proposed, in which an extension band is set to the excess frequency band adjacent to the component carrier, and the extension band is also used for radio communication, in order to improve utilization efficiency of frequency resources (see, for example, Non-Patent Literature 2).

CITATION LIST

Non-Patent Literature
Non-Patent Literature 1: 3GPP, "3GPP TS 36.104 V11.4.0", Mar. 22, 2013
Non-Patent Literature 2: AT&T, "NCT and Band Filling", R1-130665, 3GPP TSG RAN WG1 Meeting #728, Jan. 28-Feb. 1, 2013

SUMMARY OF INVENTION

Technical Problem

However, if the communication providers can freely set the extension band to the excess frequency band, various problems such as complication of implementation, an increase in overhead, deterioration in communication quality and a loss of backward compatibility may be caused.

Therefore, it is desirable to provide a system capable of utilizing the extension band efficiently by solving or reducing at least one of the problems assumed related to the band-filling.

Solution to Problem

According to the present disclosure, there is provided a communication control apparatus including: a communication control unit that controls radio communication performed by one or more terminal apparatuses on a component carrier having a basic bandwidth. The communication control unit sets an extension band to be added to the component carrier only to an excess frequency band either on an upper side or a lower side of the component carrier.

According to the present disclosure, there is provided a communication control method including: controlling radio communication performed by one or more terminal apparatuses on a component carrier having a basic bandwidth; and setting an extension band to be added to the component carrier only to an excess frequency band either on an upper side or a lower side of the component carrier.

According to the present disclosure, there is provided a radio communication system including: one or more terminal apparatuses; and a communication control apparatus. The communication control apparatus sets an extension band to be added to the component carrier only to an excess frequency band either on an upper side or a lower side of the component carrier having a basic bandwidth. At least one of the terminal apparatuses executes radio communication on the extension band.

According to the present disclosure, there is provided a terminal apparatus including: a radio communication unit that communicates with a communication control apparatus controlling radio communication performed on a component carrier having a basic bandwidth, the communication control apparatus setting an extension band to be added to the component carrier only to an excess frequency band either on an upper side or a lower side of the component carrier; and a control unit that, when the extension band is set by the communication control apparatus, allows the radio communication unit to execute the radio communication on the set extension band.

Advantageous Effects of Invention

According to the technology according to the present disclosure, it is possible to utilize the extension band in the band-filling efficiently.

BRIEF DESCRIPTION OF DRAWINGS

FIG. 11 is an explanatory diagram for explaining an example of band-filling (BF) setting information assumed for the 3 setting patterns.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference indicators, and repeated explanation is omitted.

Furthermore, description will be provided in the following order.
1. Outline of system
1-1. Nodes constituting system
1-2. Configuration of resource
1-3. Band-filling
1-4. Various settings of extension band
1-5. Arrangement of main channels
1-6. Identification of resource
1-7. Suppression in noise or interference
3. Configuration example of base station
4. Configuration example of terminal apparatus
5. Flow of processing
5-1. Band setting processing
5-2. Communication control processing
5-3. Scheduling processing
6. Summary <1. Outline of System>

First, using FIG. 1 to FIG. 3, an outline of an LTE system will be described.

[1-1. Nodes Constituting System]

Figure 1:
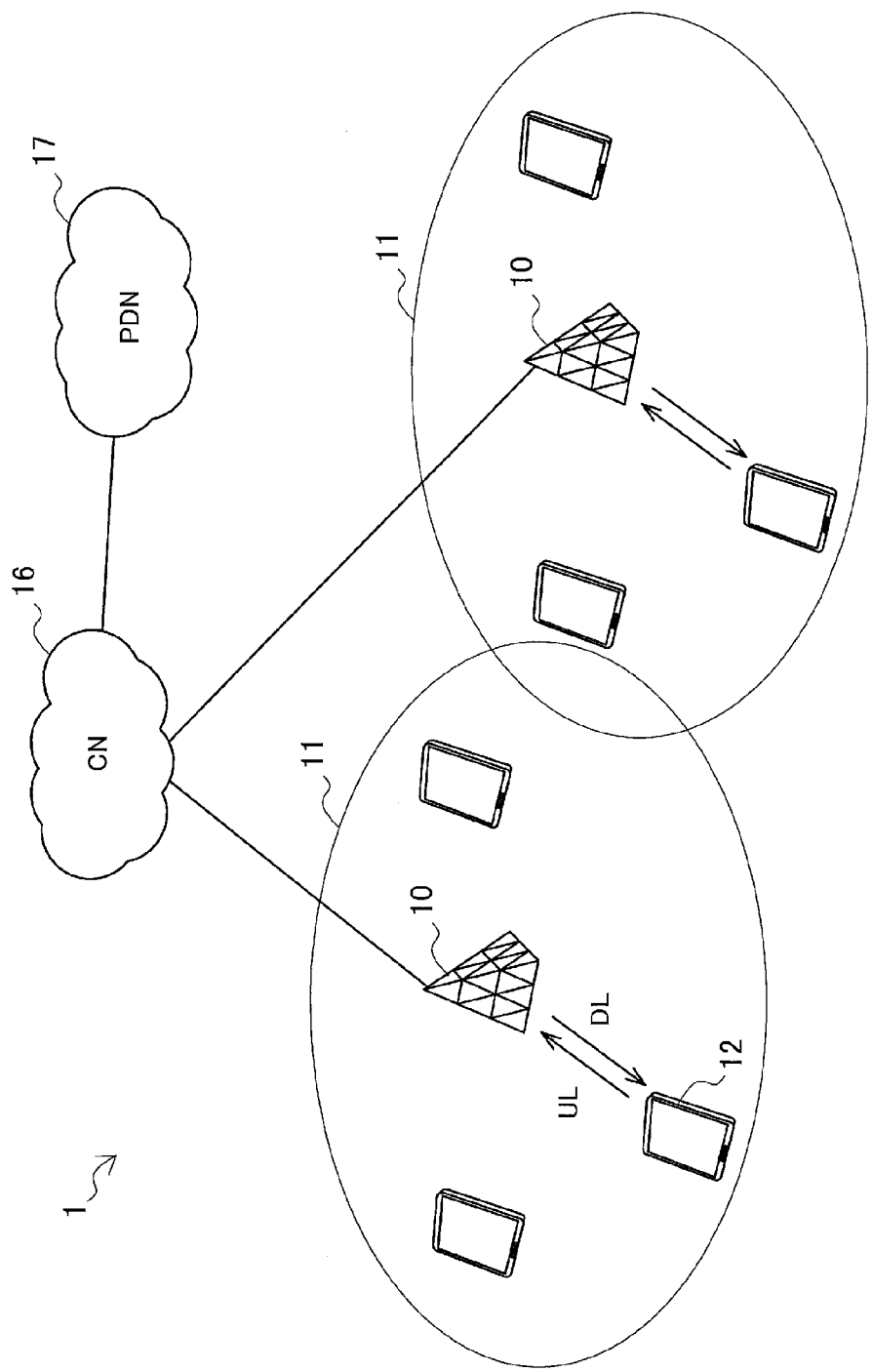
FIG. 1 is an explanatory diagram for explaining an outline of an LTE system.

FIG. 1 is an explanatory diagram for explaining the outline of the LTE system. With reference to FIG. 1, an LTE system 1 includes one or more base stations 10, one or more terminal apparatuses 12, and a core network (CN) 16.

The base station 10 is a communication control apparatus also called an evolved node B (eNB) in the LTE. The base station 10 provides radio communication service for the terminal apparatus 12 positioned within a cell 11. The base station 10 is connected to the core network 16. The terminal apparatus 12 is a radio communication apparatus also called as user equipment (UE) in the LTE. The terminal apparatus 12 is connected to the base station 10, and performs radio communication. The base station being currently connected by the terminal apparatus 12 is called a serving base station of the terminal apparatus 12. The serving base station executes various control such as scheduling, rate control, resending control and transmission power control for the individual terminal apparatuses 12. The core network 16 is also called an evolved packet core (EPC) in the LTE, and includes various control nodes such as a mobility management entity (MME), a PDN-gateway (P-GW) and a serving-gateway (S-GW) (not shown). The MME manages mobility of the terminal apparatus 12. The S-GW is a gateway transferring a packet of a user plane for the terminal apparatus 12. The P-GW is a gateway positioned at a connection point between the core network 16 and a packet data network (PDN) 17. The PDN 17 may include an IP network such as the Internet and an enterprise network.

[1-2. Configuration of Resource]

A radio link from the base station 10 to the terminal apparatus 12 is a downlink (DL). A radio link from the terminal apparatus 12 to the base station 10 is an uplink (UL). In the LTE, a group of frequency bands including various control channels and data channels defined to realize the radio communication service are called a component carrier. When the LTE system operates on a frequency division duplex (FDD) scheme, the component carrier in the downlink (downlink CC) and the component carrier in the uplink (uplink CC) are separate frequency bands. When the LTE system operates on a time division duplex (TDD) scheme, both downlink transmission and uplink transmission are performed on the one component carrier.

Figure 2:
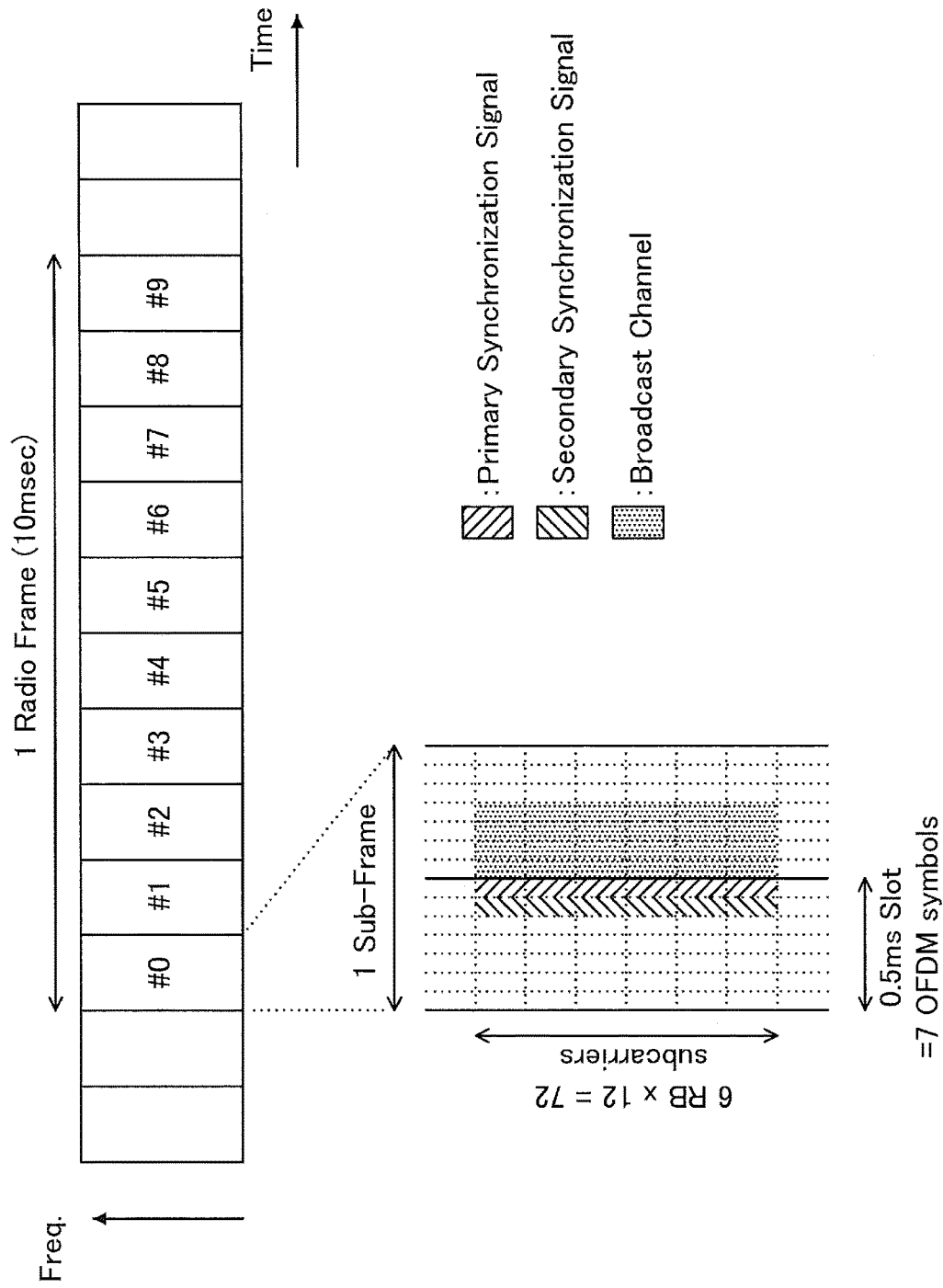
FIG. 2 is an explanatory diagram for explaining an example of a configuration of a downlink resource.

FIG. 2 is an explanatory diagram for explaining an example of a configuration of a downlink resource. In an upper part of FIG. 2, one radio frame having the length of 10 msec is shown. The one radio frame includes 10 sub-frames each having the length of 1 msec. The one sub-frame includes two 0.5 ms slots. The one 0.5 ms slot normally includes 7 OFDM symbols (6 OFDM symbols when an extension cyclic prefix is used) in a time direction. Then, the one OFDM symbol and 12 subcarriers in a frequency direction constitute one resource block. In 6 resource blocks positioned on the center of the component carrier in the frequency direction among such time-frequency resources, a resource and a broadcast channel (BCH) for transmitting a synchronization signal are arranged. In this specification, the resource for transmitting the synchronization signal is called a synchronization resource. The terminal apparatus receives a primary synchronization signal and a secondary synchronization signal on the synchronization resource in order to establish synchronization with the base station in a cell search procedure. The broadcast channel is used for broadcasting a master information block (MIB). The MIB conveys static broadcast information such as a bandwidth of the component carrier and the number of antennas of the base station. Note that dynamic broadcast information is conveyed by a system information block (SIB) on a downlink shared channel (DL-SCH). The remaining resource blocks may be used for data transmission in the downlink.

Figure 3:
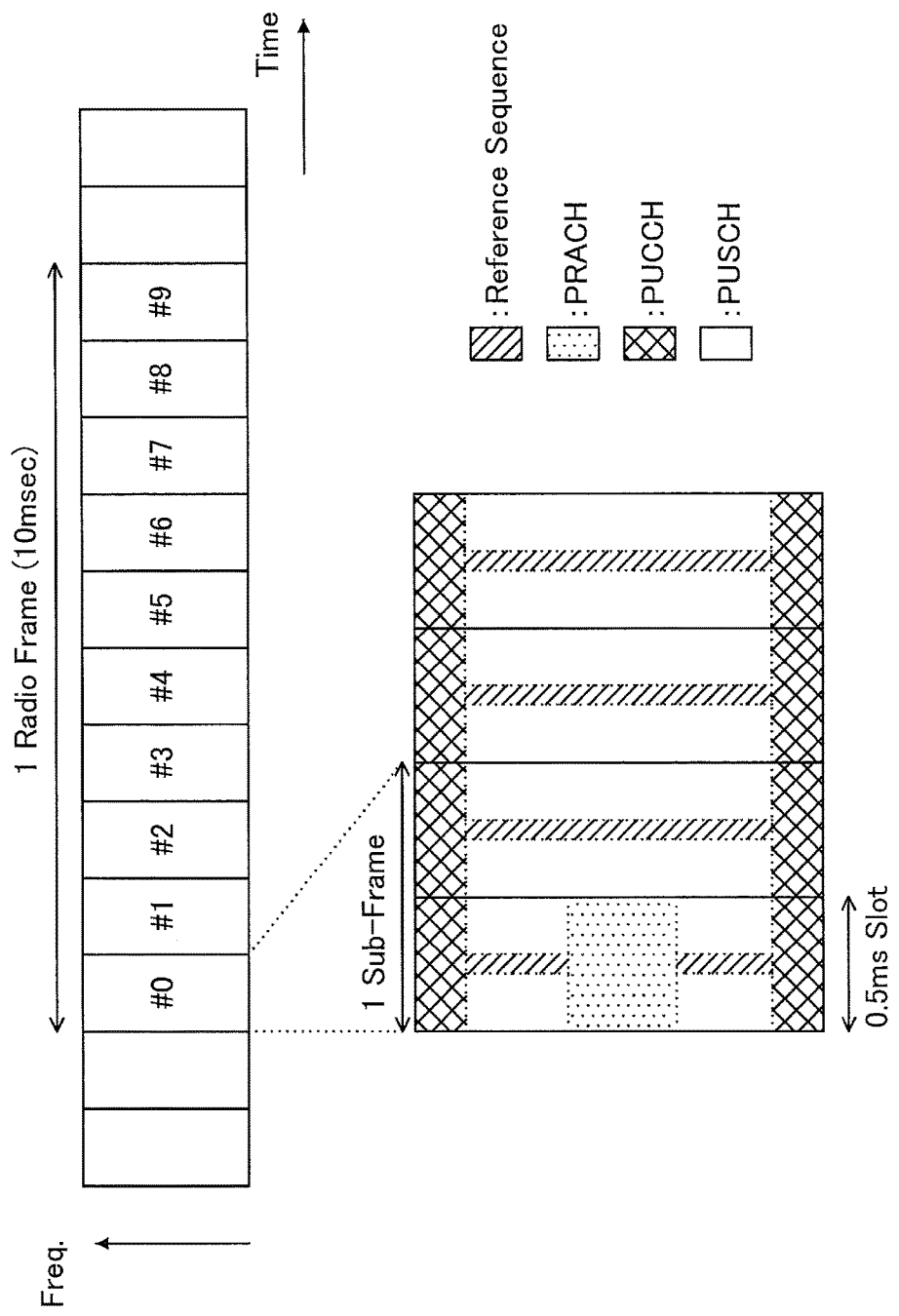
FIG. 3 is an explanatory diagram for explaining an example of a configuration of an uplink resource.

FIG. 3 is an explanatory diagram for explaining an example of a configuration of an uplink resource. Also in the uplink, one radio frame includes 10 sub-frames each having the length of 1 msec. The one sub-frame includes 2 0.5 ms slots. In the center in the time direction of each of the 0.5 ms slots, a reference sequence used by the base station for demodulating an uplink signal is arranged. A random access channel (PRACH) is used by the terminal apparatus for transmitting a random access signal (random access preamble) to the base station. The terminal apparatus acquires which of the resource blocks the random access channel is assigned to by receiving the SIB (more specifically, SIB2 of SIB1 to SIB 8). A physical uplink control channel (PUCCH) is used by the terminal apparatus for transmitting an uplink control signal. A physical uplink shared channel (PUSCH) is used by the terminal apparatus for transmitting an uplink data signal. The PUCCH is arranged in a band end of the component carrier for allowing more continuous resource blocks to be assigned to the terminal apparatus on the PUSCH. This prevents a peak-to-average power ratio (PAPR) of the uplink data signal from increasing to deteriorate power efficiency.

Note that, also in the LTE of the TDD scheme, one radio frame includes 10 sub-frames each having the length of 1 msec. However, some of the 10 sub-frames are downlink sub-frames, and some other sub-frames are uplink sub-frames.

The base station controls radio communication performed by the terminal apparatus in a resource block unit for both of the downlink resource and the uplink resource. This is applied not only to the FDD but to the TDD. For example, resource assignment information transmitted from the base station to the terminal apparatus identifies the resource block to be assigned by using a unique resource block number in a frequency domain. In this specification, the resource assignment information may include scheduling information indicating resource assignment (DL assignment and UL grant) for data transmission, and channel arrangement information indicating an arrangement of the control channels. The channel arrangement information is, for example, information for indicating the arrangement of the PRACH described above to the terminal apparatus.

[1-3. Band Filling]

The table 5.6-1 of Non-Patent Literature 1 defines 6 alternatives of the bandwidth of the component carrier in the LTE. According to the definition, the bandwidths of the component carrier include 1.4 MHz, 3 MHz, 5 MHz, 10 MHz, 15 MHz and 20 MHz. These bandwidths are called a basic bandwidth in this specification. However, frequency bands assigned to communication providers in each country are not always adapted to these basic bandwidths.

Figure 4A:
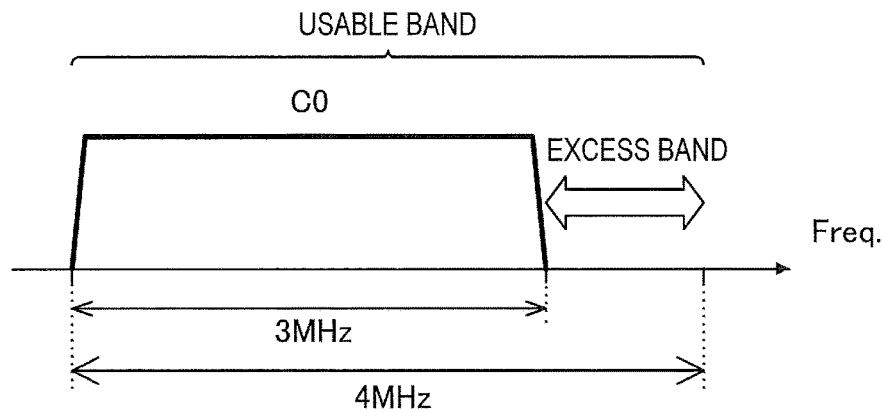
FIG. 4A is an explanatory diagram for explaining a first example of an arrangement of a component carrier in a frequency domain.

FIG. 4A is an explanatory diagram for explaining a first example of the arrangement of the component carrier in the frequency domain. In the first example, a frequency band of 4 MHz can be used for a provider. Note that, for convenience of the description, only one link direction is considered. When the provider sets a component carrier C0 having the basic bandwidth of 3 MHz to the frequency band that can be used, an excess band having a bandwidth of 1 MHz remains. However, since the bandwidth of 1 MHz is less than any basic bandwidth, this excess band is not utilized.

Figure 4B:
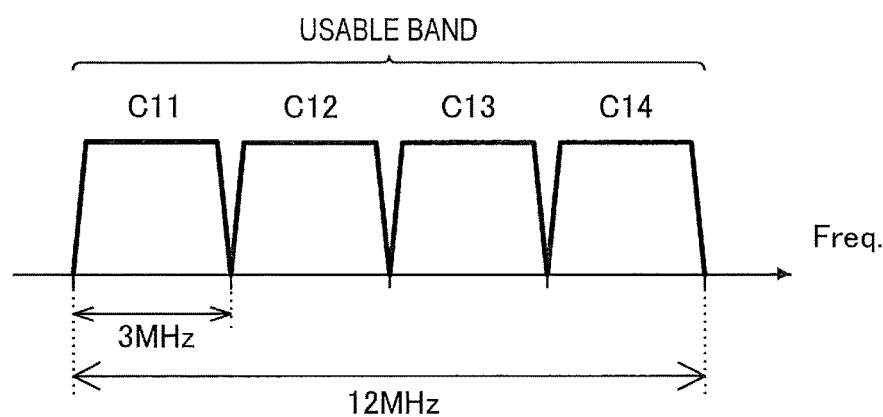
FIG. 4B is an explanatory diagram for explaining a second example of an arrangement of a component carrier in a frequency domain.

FIG. 4B is an explanatory diagram for explaining a second example of the arrangement of the component carrier in the frequency domain. In the second example, a frequency band of 12 MHz can be used for a provider. When the provider sets component carriers C11, C12, C13 and C14 each having the basic bandwidth of 3 MHz to the frequency band that can be used, and applies carrier aggregation to these component carriers, an excess band is not generated. This solution seemingly appears to be optimal in terms of utilization efficiency of the frequency resource. However, all the terminal apparatuses do not support the carrier aggregation, and the terminal apparatus that does not support the carrier aggregation can use only the one component carrier. Therefore, the solution of FIG. 4B practically includes a waste of the resource (the terminal apparatus that does not support the carrier aggregation cannot use a bandwidth of 9 MHz). Therefore, the provider may hope to set the single component carrier having the wider basic bandwidth. Further, since the carrier aggregation in the LTE-A has a restriction that intervals between the center frequencies of the multiple CCs must be the integer multiple of 300 kHz, an optimal arrangement of the component carrier may be realized only in a limited case.

Figure 4C:
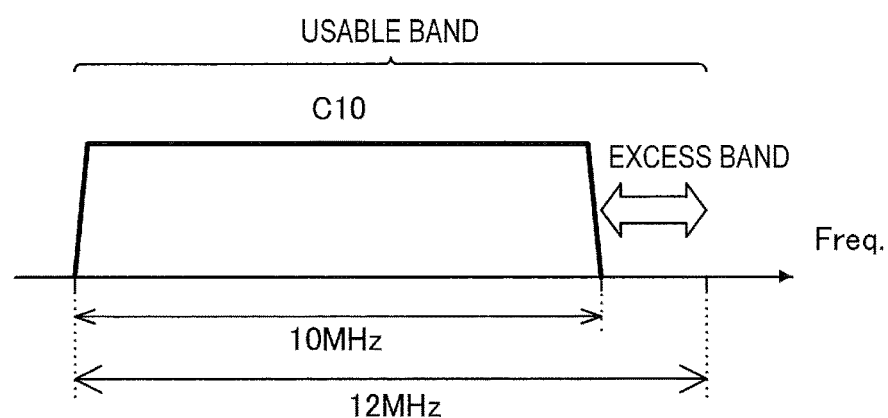
FIG. 4C is an explanatory diagram for explaining a third example of an arrangement of a component carrier in a frequency domain.

FIG. 4C is an explanatory diagram for explaining a third example of the arrangement of the component carrier in the frequency domain. Also in the third example, the frequency band of 12 MHz can be used for a provider. Unlike the second example, when the provider sets a component carrier C10 having the basic bandwidth of 10 MHz, the terminal apparatus can use the component carrier C10 regardless of whether it supports the carrier aggregation. However, with the solution of FIG. 4C, an excess band having a bandwidth of 2 MHz remains.

The band-filling is a concept for utilizing the excess frequency band as exemplified in FIG. 4A and FIG. 4C as the extension band for extending the bandwidth of the component carrier. However, there are some problems in the band-filling.

(1) Overhead of Control Signal

A bandwidth of the excess frequency band is normally assumed to be smaller than the basic bandwidth. Therefore, when a control resource (for example, a synchronization resource, a broadcast channel and other channels for a control signal) for allowing the terminal apparatus to use the extension band is arranged in the extension band, a rate of overhead of the resource for the control signal is relatively increased.

(2) Notification of Extension Bandwidth

When the component carrier and the extension band added to the component carrier are handled as one frequency band, the total bandwidth does not correspond to the specified 6 basic bandwidths in most cases. On the other hand, bandwidth information broadcasted to the terminal apparatus in the existing MIB can only indicate any of the 6 basic bandwidths. Modification of the bandwidth information hinders a normal operation of the terminal apparatus that does not support radio communication on the extension band (hereinafter, referred to as a legacy terminal). Therefore, it is desirable to introduce a new information element for notifying the terminal apparatus of a bandwidth of the extension band (hereinafter, referred to as an extension bandwidth) without modifying the bandwidth information for the basic bandwidth in the MIB. However, if the extension bandwidth can take any value, the number of bits of the new information element may increase excessively.

(3) Compatibility with Legacy Terminal

As described above, the resource assignment information transmitted from the base station to the terminal apparatus identifies the individual resources in the resource block unit. Normally, the resource block numbers are granted to the resource blocks in the increasing order of the frequency. However, when the resource block numbers smaller than those of the component carrier are granted to the resource blocks in the extension band in the case where the extension band is set to a lower side (a lower side of the frequency) of the component carrier, the legacy terminal may misunderstand that the resource block numbers point to the resource blocks in the component carrier.

(4) Complexity of Transmitter-Receiver

Since there are only 6 alternatives of the basic bandwidth in the LTE, a transmitter-receiver as an apparatus receiving radio signals of the LTE only may be designed so as to handle the 6 basic bandwidths. Specifically, circuit parameters such as a sampling rate, a cut-off frequency of a low-pass filter and a fast Fourier transform (FFT) size may depend on a transmitting and receiving band (and a bandwidth thereof). However, when the extension bandwidth is set to any value, the transmitter-receiver will be required to be designed so as to correctly operate for every setting value of the extension band, resulting in a remarkable increase in implementation cost of the apparatus.

(5) Deterioration in Reception Quality of Legacy Terminal

When the extension band is set to the excess frequency band adjacent to the downlink CC, the legacy terminal recognizes a signal received on the extension band as noise. The low-pass filter of the transmitter-receiver of the legacy terminal cannot thoroughly remove this noise received at a frequency close to that of a desired signal. Therefore, the transmission of the radio signal on the extension band may deteriorate reception quality in the legacy terminal.

(6) Time of Cell Search

According to the procedure of the existing cell search, the terminal apparatus can detect the synchronization signal by using as a clue the fact that the synchronization signal is transmitted in the band center of the downlink CC. However, when the extension band is set, the synchronization signal does not always exist in the center of the band including the downlink CC and the extension band. If the position of the synchronization signal is unclear, the terminal apparatus cannot help searching for the synchronization signal blindly to elongate a time before it is detected.

(7) Interference Caused by Extension Band

When a radio signal is transmitted on the extension band in a certain cell, the radio signal may cause inter-cell interference in adjacent cells. The base station in the LTE has a system called inter-cell interference coordination (ICIC) for suppressing the inter-cell interference, but since the current ICIC is not designed in consideration of the band-filling, it is beneficial to introduce an additional system for suppressing the inter-cell interference caused by the extension band.

(8) Discontinuity of Uplink Resource

As described above, the PUCCH used by the terminal apparatus to transmit the uplink control signal is arranged in the band end of the component carrier in order to make it possible to assign more continuous resource blocks to the terminal apparatus on the PUSCH. However, when the extension band is set to the outside of the band of the component carrier, the PUSCH of the component carrier and the channel in the extension band become discontinuous across the PUCCH.

The technology according to the present disclosure is provided for solving or reducing at least one of the problems assumed related to the band-filling as described here.

[1-4. Setting Patterns of Extension Band]

Figure 5A:
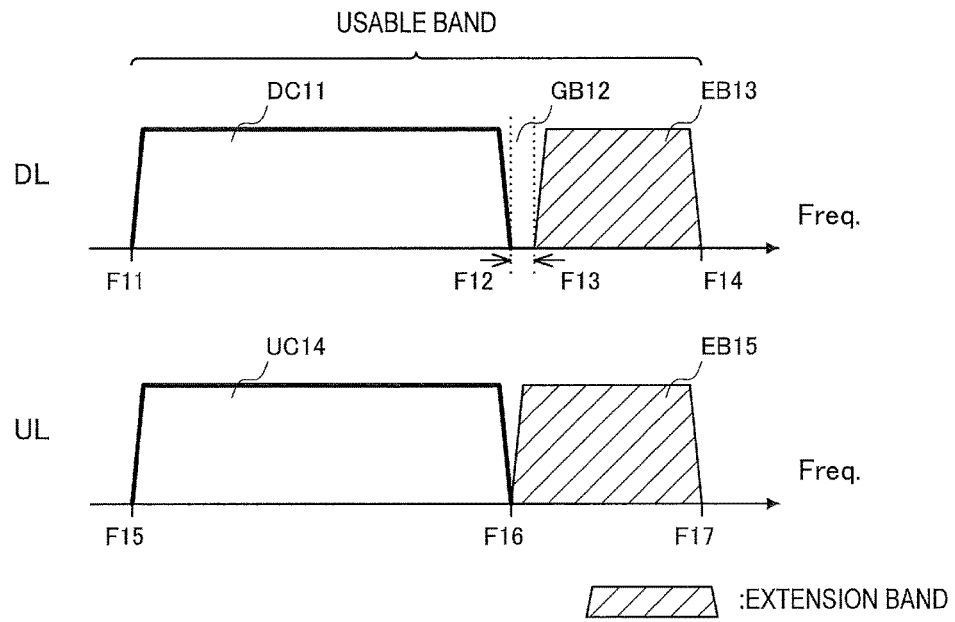
FIG. 5A is an explanatory diagram illustrating an example of an extension band set on one side.
Figure 5B:
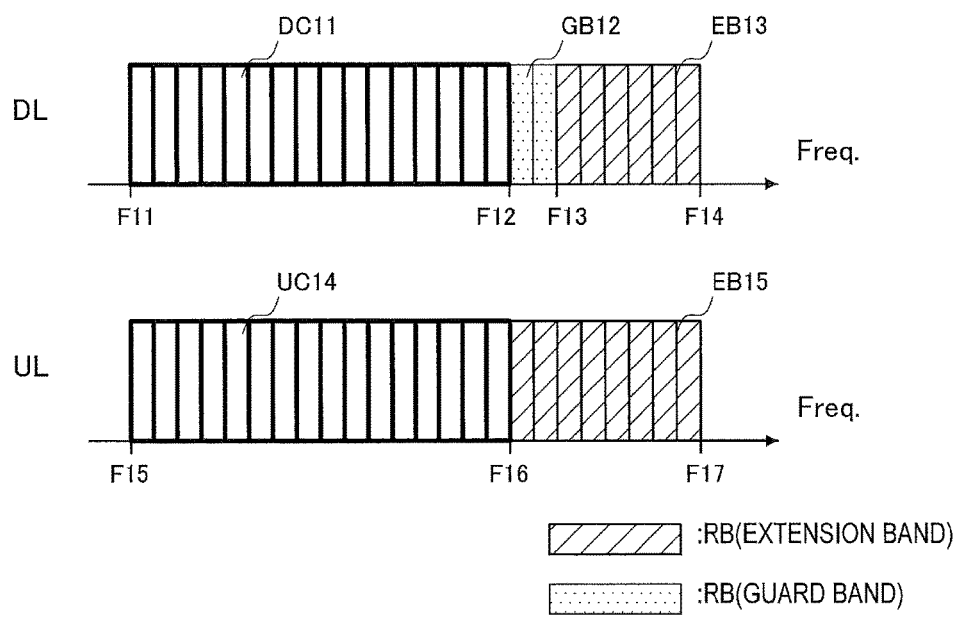
FIG. 5B is an explanatory diagram for explaining the setting of the extension band in a resource block unit, related to the example of FIG. 5A.

FIG. 5A to FIG. 5C are explanatory diagrams illustrating 3 setting patterns of the extension band, respectively. These setting patterns are distinguished by a positional relationship between the component carrier and the extension band added to the component carrier. A first setting pattern is one-side setting, a second setting pattern is both-side symmetric setting, and a third setting pattern is both-side asymmetric setting.

(1) One-Side Setting

FIG. 5A illustrates an example of the one-side setting. According to the one-side setting, the extension band is added to the component carrier only in the excess frequency band on either the upper side or the lower side of the component carrier. With reference to FIG. 5A, a downlink CC DC11 and an uplink CC UC14 are arranged in a band from a frequency F11 to a frequency F12 and in a band from a frequency F15 to a frequency F16, respectively. An extension band EB13 is an extension band added to the downlink CC DC11. The extension band EB13 occupies a band from a frequency F13 to a frequency F14 on the upper side of the downlink CC DC11. An extension band EB15 is an extension band added to the uplink CC UC14. The extension band EB15 occupies a band from a frequency F16 to a frequency F17 on the upper side of the uplink CC UC14.

A gap between the upper end frequency F12 of the downlink CC DC11 and the lower end frequency F13 of the extension band EB13 is used as a guard band GB12. In the guard band, a radio signal is not transmitted. As a result of the arrangement of such a guard band, the transmitter-receiver of the legacy terminal can suppress the noise or interference caused by the radio signal on the extension band, for example, by using a filter. Note that, since the guard band is a band that is not used for transmission of the radio signal, the arrangement of the guard band has a negative effect in terms of resource utilization efficiency. However, according to the one-side setting as exemplified in FIG. 5A, it is enough to arrange only the one guard band on either the upper side or the lower side of the downlink CC. Therefore, it can be said that the one-side setting is an effective setting pattern realizing an appropriate balance between the avoidance of deterioration in reception quality of the legacy terminal and the resource utilization efficiency. Further, the one-side setting is also a setting pattern allowing more continuous shared channels to be arranged in the extension band in the uplink, compared with the both-side setting to be described later. Since the base station receiving the uplink signal knows the existence of the extension band, the guard band may not be arranged between the uplink CC UC14 and the extension band EB15.

In a certain embodiment, the extension band is set so as to have the extension bandwidth of the integer multiple of the size of the resource block. As described above, one resource block has 12 subcarriers in the frequency direction. Since the subcarriers are arranged at frequency intervals of 15 kHz, the size of the one resource block in the frequency direction (hereinafter, referred to as an RB size) is 180 kHz. With reference to the example of FIG. 5B, the extension band EB13 occupies 6 resource blocks in the frequency direction (F14−F13=6×180=1080 [kHz]). The guard band GB12 occupies 2 resource blocks in the frequency direction (F13−F12=2×180=360 [kHz]). The extension band EB15 occupies 8 resource blocks in the frequency direction (F17−F16=8×180=1440 [kHz]).

The arrangement of the extension band in the resource block unit in this manner allows the extension band to be expressed by the number of the resource blocks. This makes it possible to notify the terminal apparatus of the extension band with a small number of bits by using an index based on the number of the resource blocks (for example, the number of the resource blocks itself, a code mapped to the number of the resource blocks, or any value calculated from the number of the resource blocks).

The guard band may be arranged in the resource block unit (that is, so as to have the bandwidth of the integer multiple of the RB size), or may be arranged, for example, in a subcarrier unit (that is, so as to have the bandwidth of the integer multiple of 15 kHz). The terminal apparatus may be explicitly notified of the setting of the guard band. Instead, the notification of the setting of the guard band may be omitted by, for example, specifying the bandwidth in advance. Further, when the guard band is arranged in the resource block unit, the bandwidth of the guard band may be a part of the extension bandwidth reported to the terminal apparatus. In this case, even when the bandwidth of the guard band is not explicitly reported, for example, when the base station does not schedule the downlink transmission on the guard band, it is possible to substantially realize the guard band without making the terminal apparatus notice the existence of the guard band. This can reduce overhead of information required for the notification of the guard band, and makes it easy for the base station to dynamically change the bandwidth of the guard band.

(2) Both-Side Symmetric Setting

Figure 6A:
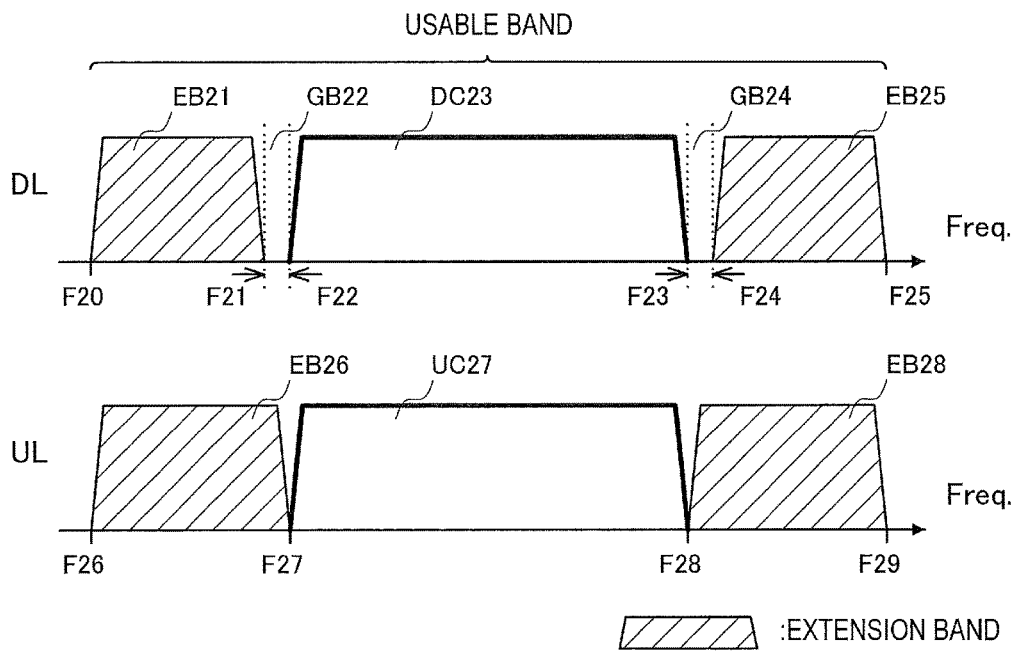
FIG. 6A is an explanatory diagram illustrating an example of the extension band symmetrically set on both sides.

FIG. 6A illustrates an example of the both-side symmetric setting. According to the both-side symmetric setting, the extension bands are symmetrically added to the component carrier in the excess frequency bands on the upper side and the lower side of the component carrier. With reference to FIG. 6A, a downlink CC DC23 and an uplink CC UC27 are arranged in a band from a frequency F22 to a frequency F23 and in a band from a frequency F27 to frequency F28, respectively. An extension band EB21 is a lower-side extension band added to the downlink CC DC23. The extension band EB21 occupies a band from a frequency F20 to a frequency F21. A guard band GB22 is arranged between the extension band EB21 and the downlink CC DC23. An extension band EB25 is an upper-side extension band added to the downlink CC DC23. The extension band EB25 occupies a band from a frequency F24 to a frequency F25. A guard band GB24 is arranged between the downlink CC DC23 and the extension band EB25. An extension band EB26 is a lower-side extension band added to the uplink CC UC27. The extension band EB26 occupies a band from a frequency F26 to a frequency F27. An extension band EB28 is an upper-side extension band added to the uplink CC UC27. The extension band EB28 occupies a band from a frequency F28 to a frequency F29. In the uplink, the guard band may not be arranged.

Figure 6B:
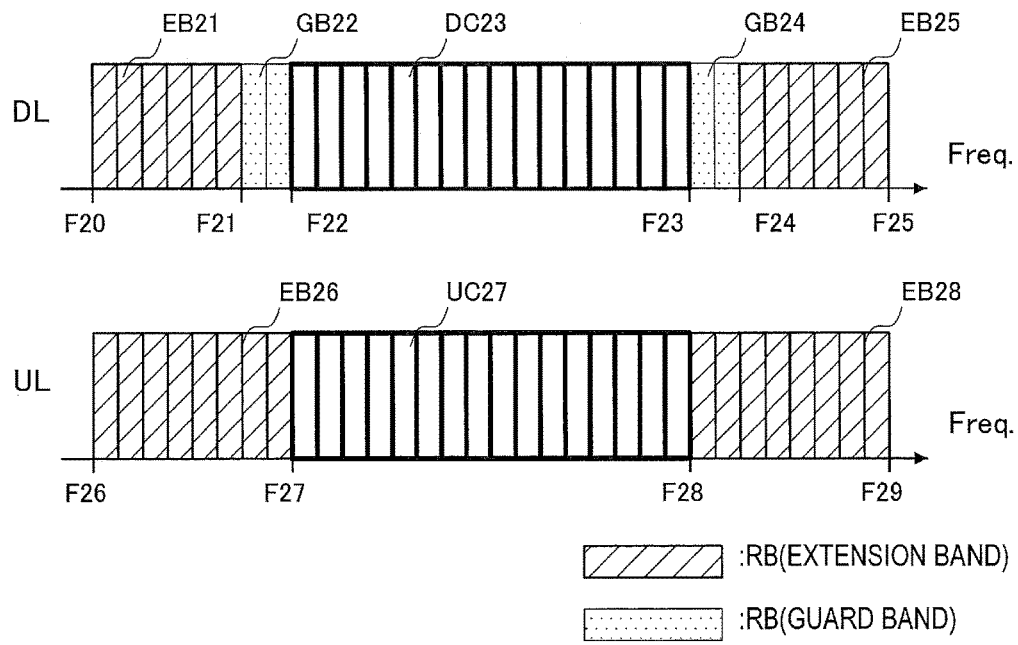
FIG. 6B is an explanatory diagram for explaining the setting of the extension band in the resource block unit, related to the example of FIG. 6A.

In a certain embodiment, the extension band is set so as to have the extension bandwidth of the integer multiple of the size of the resource block. With reference to the example of FIG. 6B, the extension bands EB21 and EB25 occupy 6 resource blocks in the frequency direction. The guard bands GB22 and G24 occupy 2 resource blocks in the frequency direction. The extension bands EB26 and EB28 occupy 8 resource blocks in the frequency direction. When the extension blocks are arranged in the resource block unit in this manner, it is possible to express the extension bandwidth by the number of the resource blocks. This makes it possible to notify the terminal apparatus of the extension bandwidth with a small number of bits by using the index based on the number of the resource blocks. In the both-end symmetric setting, since the extension bands on both sides of the component carrier have the same extension bandwidth, it is enough for the terminal apparatus to be notified of only information on one extension bandwidth for the two extension bands.

The guard bands may be symmetrically arranged in the resource block unit, or may be symmetrically arranged in the subcarrier unit. The terminal apparatus may be explicitly notified of the setting of the guard bands, or may not be notified of the setting of the guard bands. Further, in the case where the guard bands are arranged in the resource block unit, when the terminal apparatus is not explicitly notified of the bandwidth of the guard band, and, for example, when the base station does not schedule the downlink transmission on the guard band, the guard band may be substantially realized. This can reduce the overhead of the information required for the notification of the guard band, and can make it easy for the base station to dynamically change the bandwidth of the guard band.

(3) Both-Side Asymmetric Setting

Figure 7A:
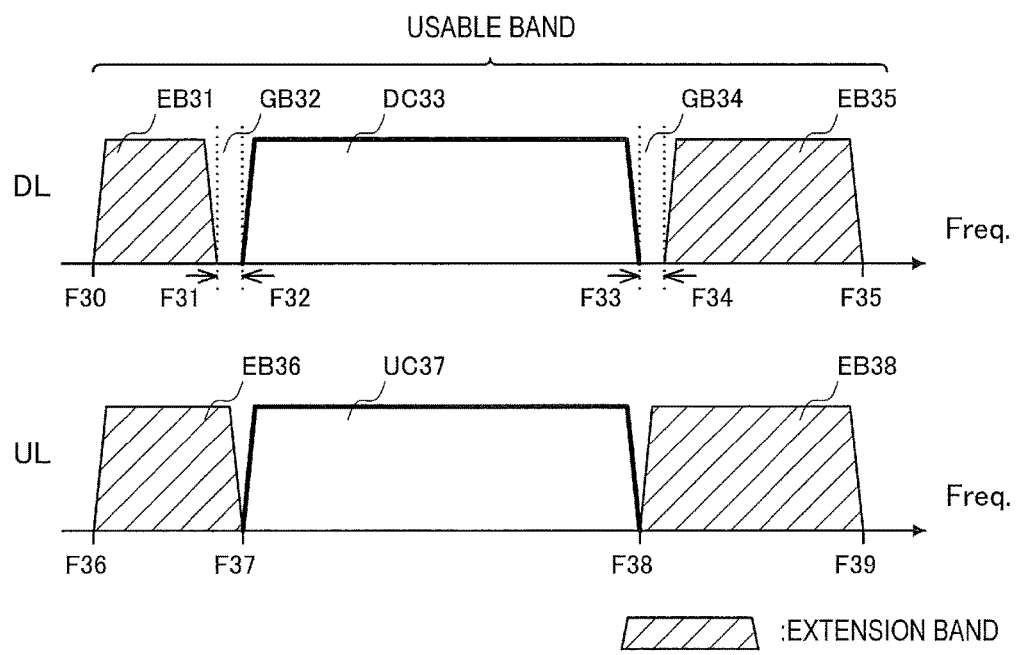
FIG. 7A is an explanatory diagram illustrating an example of the extension band asymmetrically set on both sides.

FIG. 7A illustrates an example of the both-side asymmetric setting. According to the both-side asymmetric setting, the extension bands are asymmetrically added to the component carrier in the excess frequency bands on the upper side and the lower side of the component carrier. With reference to FIG. 7A, a downlink CC DC33 and an uplink CC UC37 are arranged in a band from a frequency F32 to a frequency F33 and in a band from a frequency F37 to frequency F38, respectively. An extension band EB21 is a lower-side extension band added to the downlink CC DC33. The extension band EB31 occupies a band from a frequency F30 to a frequency F31. A guard band GB 32 is arranged between the extension band EB31 and the downlink CC DC33. An extension band EB35 is an upper-side extension band added to the downlink CC DC33. The extension band EB35 occupies a band from a frequency F34 to a frequency F35. A guard band GB 34 is arranged between the downlink CC DC33 and the extension band EB35. An extension band EB36 is a lower-side extension band added to the uplink CC UC37. The extension band EB36 occupies a band from a frequency F36 to a frequency F37. An extension band EB38 is an upper-side extension band added to the uplink CC UC37. The extension band EB38 occupies a band from a frequency F38 to a frequency F39. In the uplink, the guard band may not be arranged.

Also in the both-side asymmetric setting, when a radio signal is not transmitted in the guard band between the downlink CC and the two extension bands, it is possible to suppress noise or interference in a reception circuit of the legacy terminal to avoid deterioration in reception quality. Further, the both-side asymmetric setting has an effect being more advantageous than the one-side setting described above in terms of a cell search procedure to be described later.

Figure 7B:
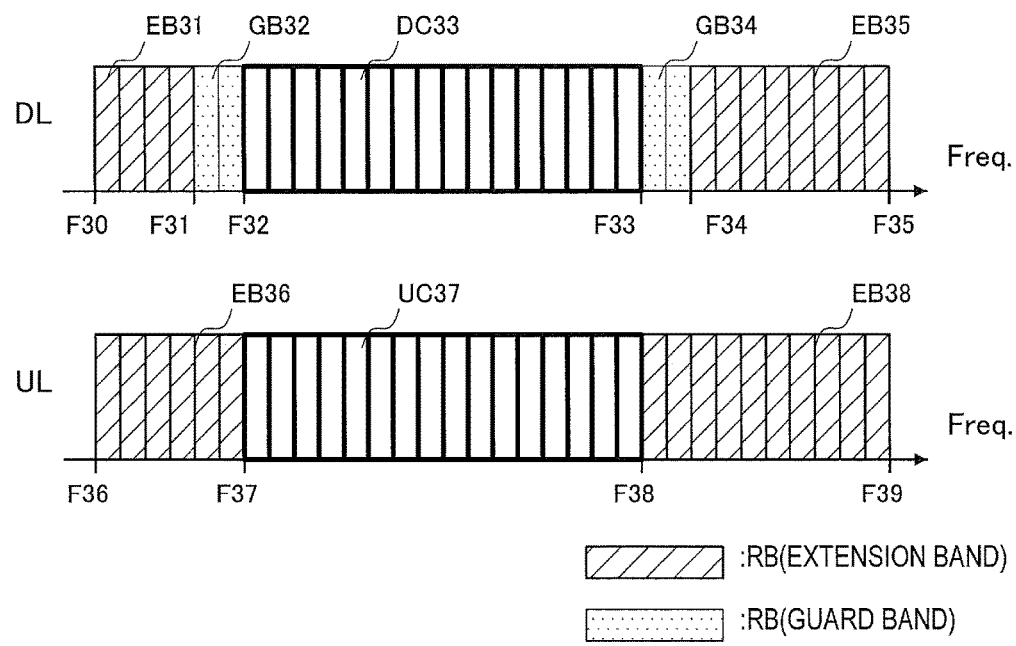
FIG. 7B is an explanatory diagram for explaining the setting of the extension band in the resource block unit, related to the example of FIG. 7A.

In a certain embodiment, the extension band is set so as to have the extension bandwidth of the integer multiple of the size of the resource block. With reference to the example of FIG. 7B, the extension band EB31 occupies 4 resource blocks in the frequency direction. The guard bands GB32 and GB34 occupy 2 resource blocks in the frequency direction. The extension bands EB35 occupies 8 resource blocks in the frequency direction. The extension bands EB36 occupies 6 resource blocks in the frequency direction. The extension bands EB38 occupies 10 resource blocks in the frequency direction. When the extension blocks are arranged in the resource block unit in this manner, it is possible to express the extension bandwidth by the number of the resource blocks. This makes it possible to notify the terminal apparatus of the extension bandwidth with a small number of bits by using the index based on the number of the resource blocks. Also in the both-end asymmetric setting, when the terminal apparatus is not explicitly notified of the bandwidth of the guard band, the overhead of the information required for the notification of the guard band may be reduced.

When these setting patterns are compared with each other, it can be said that the one-side setting is the best in terms of the utilization efficiency of the resource, the reduction in the overhead, and the continuity of the uplink resource. Then, in an embodiment to be described later, the one-side setting is adopted as the setting pattern of the extension band.

[1-5. Arrangement of Main Channels]

(1) Downlink

Even when any setting pattern is selected, by using the synchronization resource of the component carrier for allowing the terminal apparatus to be synchronized with the extension band, it is possible to avoid an increase in overhead of the resource required for transmission of the synchronization signal. In this case, the base station operates the component carrier and the extension band added to the component carrier in time synchronization with each other. Further, control information such as the broadcast information referred to by the terminal apparatus to use the extension band may be also transmitted on the component carrier instead of the extension band.

Figure 8:
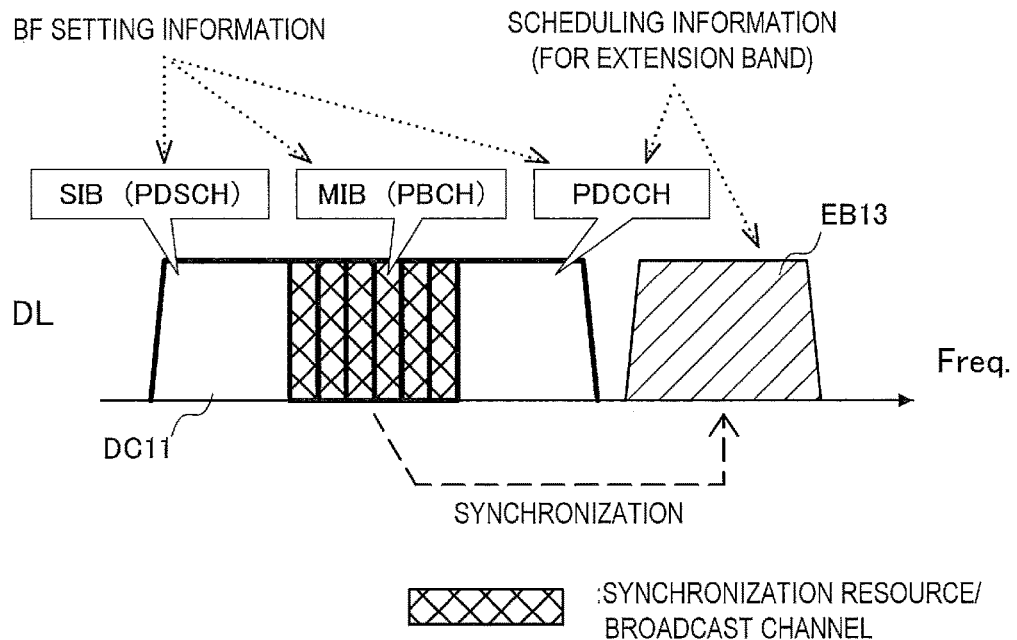
FIG. 8 is an explanatory diagram for explaining an example of an arrangement of a synchronization resource and a broadcast channel in the one-side setting.

FIG. 8 is an explanatory diagram for explaining an example of an arrangement of the synchronization resource and the broadcast channel in the one-side setting. With reference to FIG. 8, the downlink CC DC11 and the extension band EB13 on the upper side of the downlink CC DC11 are shown. In 6 resource blocks in the center of the downlink CC DC11, the synchronization resource for transmitting the primary synchronization signal and the secondary synchronization signal is arranged. This synchronization resource of the downlink CC DC11 is used also for allowing the terminal apparatus to be synchronized with the extension band EB13. In this manner, when the synchronization resource is used in common between the component carrier and the extension band, both of the legacy terminal and a non-legacy terminal will have only to search for the synchronization signal on the synchronization resource of the component carrier in the procedure of the cell search. Therefore, without modifying implementation of the procedure of the existing cell search, it is possible to implement the non-legacy terminal. Further, even when the extension bandwidth is less than the minimum basic bandwidth, it is possible to allow the terminal apparatus to be appropriately synchronized with the extension band by using the synchronization resource arranged in the component carrier instead of the extension band.

In the resource blocks positioned at the same frequency as that of the synchronization resource, a physical broadcast channel (PBCH) for transmitting the broadcast information is arranged. The PBCH is a physical channel corresponding to the BCH. For example, band-filling (BF) setting information indicating the extension bandwidth and the like may be broadcasted in the MIB on the PBCH. Further, the BF setting information may be broadcasted in the SIB on the PDSCH. Instead, the BF setting information may be transmitted to the individual terminal apparatuses on the PDCCH. In this manner, the setting information related to the extension band is transmitted on the downlink CC, the non-legacy terminal can acquire the setting of the extension band by first establishing the synchronization with the downlink CC, and then receiving the setting information on the component carrier. This makes it possible to smoothly transfer an operation from an operation state in which the band-filling is not performed to an operation state in which the band-filling is performed.

Furthermore, scheduling information on the resource blocks in the extension band, along with scheduling information on the resource blocks in the component carrier, may be transmitted to the terminal apparatus on the PDCCH of the downlink CC DC11. This makes it possible to reduce overhead of the resource required for transmission of the scheduling information. Further, acknowledge (ACK)/negative acknowledge (NACK) to uplink transmission on the extension band in the uplink may be transmitted to the terminal apparatus on a physical hybrid-ARQ indicator channel (PHICH) of the downlink CC DC11. When uplink transmission is performed on the uplink CC and the extension band in the uplink, the ACK/NACK to the uplink transmission may be processed and combined in the same HARQ processes in the base station and transmitted to the terminal apparatus. This makes it possible to reduce overhead of the resource required for transmission of the ACK/NACK.

(2) Uplink

As described above, the PUCCH used by the terminal apparatus to transmit the uplink control signal is arranged in the band end of the uplink CC. When the terminal apparatus transmits the data signal, it is desirable to assign as many continuous resource blocks as possible in the PUSCH to the terminal apparatus in order to avoid the rise of the PAPR. However, if many of the resources in the PUSCH for transmission of a control signal and a random access signal (hereinafter, collectively referred to as a non-data signal) by the non-legacy terminal, it becomes difficult to assign the continuous resource blocks in the PUSCH to the legacy terminal that cannot use the extension band. Then, in a certain embodiment, the transmission of the non-data signals in the uplink by the non-legacy terminal is preferentially assigned to the extension band.

Figure 9:
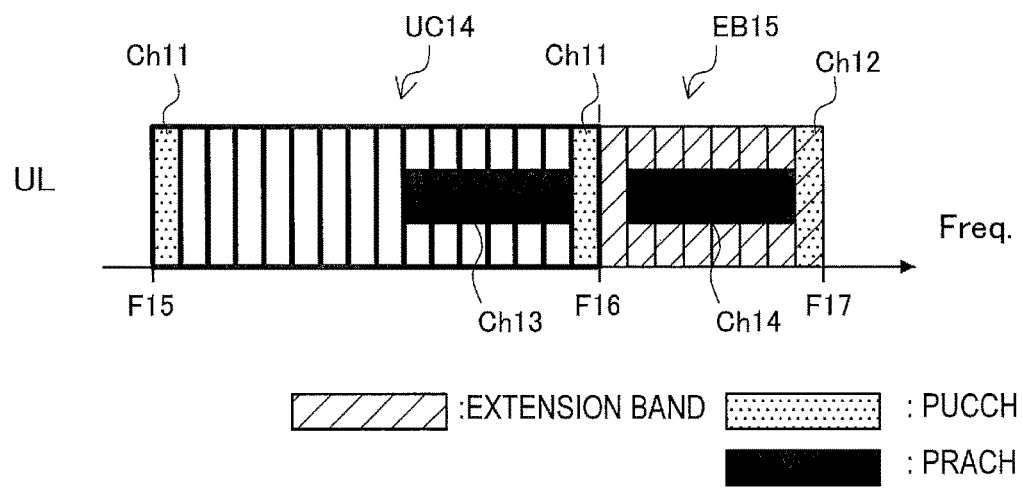
FIG. 9 is an explanatory diagram for explaining an example of an arrangement of an uplink control channel in the one-side setting.

FIG. 9 is an explanatory diagram for explaining an example of an arrangement of the uplink control channel in the one-side setting. With reference to FIG. 9, the uplink CC UC14 and the extension band EB15 on the upper side of the uplink CC UC14 are shown. A physical uplink control channel (PUCCH) Ch11 is arranged in the band end of the uplink CC UC14. A PUCCH Ch12 may be arranged in the band end of the extension band EB15. The legacy terminal can use only the uplink CC UC14. A physical random access channel (PRACH) Ch13 for the legacy terminal is assigned to the resource blocks in the uplink CC UC14. Therefore, the resource blocks of the PUSCH other than the PUCCH Ch11 and the PRACH Ch13 in the uplink CC UC14 can be used for transmission of the data signal by the legacy terminal. In the example of FIG. 9A, a separate PRACH Ch14 for the non-legacy terminal is assigned to the resource blocks in the extension band EB15. Accordingly, as many usable (and continuous) resource blocks as possible in the PUSCH are left in the uplink CC UC14 for the legacy terminal.

In this manner, when the PUCC and PRACH for the non-legacy terminal (channels for the non-data signal) are preferentially assigned to the extension band in the uplink instead of the uplink CC, it is possible for the legacy terminal to successfully transmit the uplink data signal by using more continuous resource blocks in the PUSCH. Further, when separate random access channels are prepared in the legacy terminal and the non-legacy terminal, respectively, the possibility of collision of the random access signal may be reduced to improve throughput of the system.

The legacy terminal may be notified of the arrangement of the PRACH for the non-legacy terminal described using FIG. 9, separately from the channel arrangement information on the arrangement of the PRACH for the legacy terminal, conveyed on the SIB2. This new channel arrangement information may be broadcasted using a new information element of the SIB in the downlink CC exemplified in FIG. 8, or may be transmitted to the individual terminal apparatuses on the PDCCH.

Furthermore, the ACK/NACK to downlink transmission on the downlink CC and the extension band in the downlink may be processed and combined in the same HARQ processes in the terminal apparatus and transmitted to the base station. This makes it possible to reduce overhead of the resource required for transmission of the ACK/NACK. Note that the ACK/NACK to the downlink transmission may be transmitted on the PUCCH or the PUSCH.

[1-6. Identification of Resources]

(1) Numbering Rule

Figure 10A:
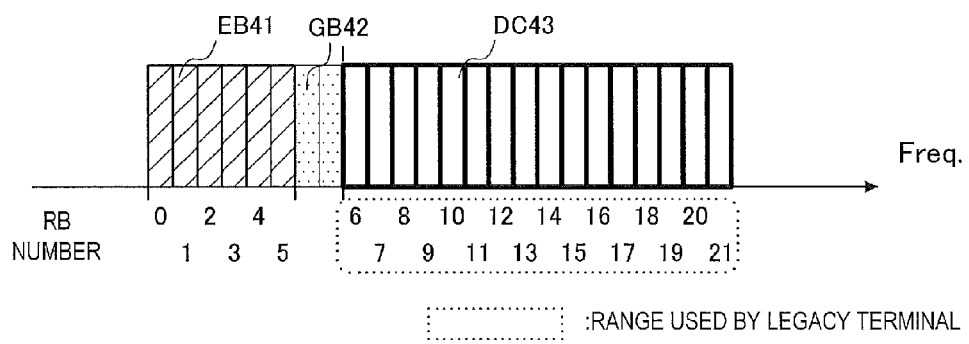
FIG. 10A is an explanatory diagram for explaining a resource block number granted according to an existing method.

As described above, normally, in the resource assignment information transmitted from the base station to the terminal apparatus, the individual resources are identified by using the resource block numbers granted to the resource blocks in the increasing order of the frequency. When the extension band is added to the component carrier, it is desirable that the resource block number is unique through the component carrier and the extension band. However, the extension band is set to the band on the lower side of the component carrier, when the numbers are granted to the resource blocks in the increasing order of the frequency, the numbers granted to the resource blocks in the extension band on the lower side are set to be smaller than the numbers granted to the resource blocks in the component carrier. FIG. 10A illustrates an example of such a situation. In the example of FIG. 10A, an extension band EB41 includes 6 resource blocks having the resource block numbers from "0" to "5", respectively. A downlink CC DC43 includes 16 resource blocks having the resource block numbers from "6" to "21", respectively. Note that the number of the resource blocks in each of the component carrier and the extension band is merely an example for description. Each band may include more resource blocks or less resource blocks.

According to the existing numbering rule exemplified in FIG. 10A, the resource block numbers granted to the resource blocks in the component carrier are changed depending on the bandwidth of the extension band on the lower side of the component carrier. As a result, there is a possibility that the legacy terminal will misunderstand that the small resource block numbers granted to the resource blocks in the extension band EB41 point to the resource blocks in the component carrier DC43. When the legacy terminal falsely interprets the resource block numbers, radio communication by the legacy terminal would not operate correctly. Then, in a certain embodiment, a number rule is adopted in which the resource block numbers are uniquely granted to the respective resource blocks through the component carrier and the extension band, and however, the resource block numbers smaller than those of the resource blocks included in the extension band are granted to any resource blocks included in the component carrier. This makes it possible to solve the risk that the legacy terminal misunderstands the meaning of the resource block numbers.

Figure 10B:
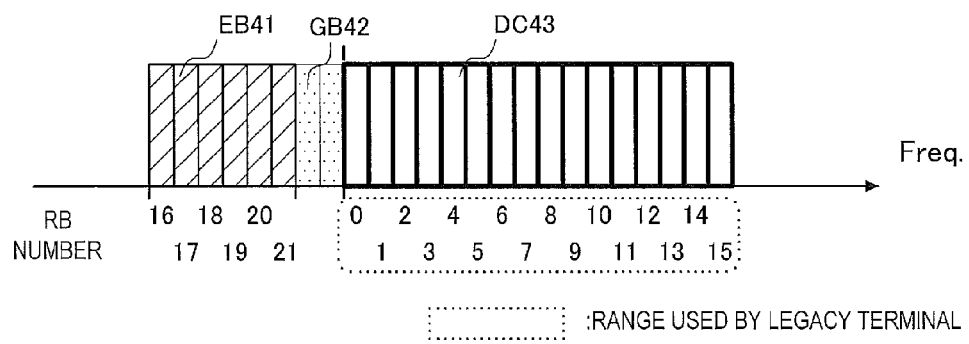
FIG. 10B is an explanatory diagram for explaining a first example of a new numbering rule of the resource block number.

FIG. 10B is an explanatory diagram for explaining a first example of the new numbering rule of the resource block numbers. With reference to FIG. 10B, similarly to FIG. 10A, the downlink CC DC43, and the extension band EB41 on the lower side of the downlink CC DC43 are shown. A guard band GB42 exists between the extension band EB41 and the downlink CC DC43. According to the first example of the numbering rule, the resource block numbers are granted to the one or more resource blocks in the downlink CC DC43 in the increasing order of the frequency from zero. In the example of FIG. 10B, the resource block numbers from "0" to "15" are granted to 16 resource blocks in the downlink CC DC43, respectively. Further, the resource block numbers from "16" to "21" are granted to the resource blocks in the extension band EB41, respectively. In the first example, the existence of the guard band is not considered in the numbering of the resource block numbers.

Figure 10C:
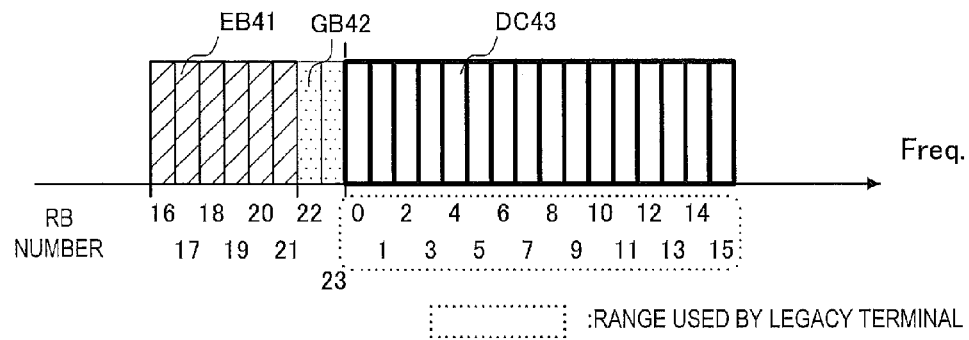
FIG. 10C is an explanatory diagram for explaining a second example of a new numbering rule of the resource block number.

FIG. 10C is an explanatory diagram for explaining a second example of the new numbering rule of the resource block number. Also in the second example of the numbering rule, the resource block numbers are granted to the one or more resource blocks in the downlink CC DC43 in the increasing order of the frequency from zero. In the example of FIG. 10C, the resource block numbers from "0" to "15" are granted to 16 resource blocks in the downlink CC DC43, respectively. Further, the resource block numbers from "16" to "23" are granted to the resource blocks in the extension band EB41 and the guard band GB42, respectively. The second example of the numbering rule may be used, for example, in a case where the terminal apparatus is not explicitly informed of the bandwidth of the guard band. In this case, the terminal apparatus may recognize the resource blocks in the guard band as a part of the extension band.

In the first example and the second example of the numbering rule described above, the legacy terminal identifies the resource blocks in the downlink CC DC43 by using the resource block numbers from "0" to "15". These resource block numbers are not changed depending on where or not the extension band is set, and the bandwidth of the extension band. Therefore, it is possible to solve the risk that the legacy terminal misunderstands the meaning of the resource block numbers, to secure backward compatibility.

(2) BF Setting Information

FIG. 11 is an explanatory diagram for explaining an example of the BF setting information assumed for the 3 setting patterns. As described using FIG. 8, the BF setting information is control information for notifying the non-legacy terminal of the setting of the extension band. With reference to FIG. 11, the BF setting information includes 6 data items of an "extension direction", a "bandwidth 1", a "bandwidth 2", a "guard bandwidth", and a "channel arrangement".

The "extension direction" is a division identifying the setting pattern of the extension band. As an example, a value "0" or "1" of the "extension direction" indicates the one-side setting, and when the value is "0", the extension band is set on the upper side of the component carrier, and when the value is "1", the extension band is set on the lower side of the component carrier. A value "2" of the "extension direction" indicates the both-side symmetric setting. A value "3"

of the "extension direction" indicates the both-side asymmetric setting. Note that, when only the one-side setting can be selected as a restriction of the system, the "extension direction" may be a 1-bit flag indicating the value "0" or "1". When only the both-side symmetric setting can be selected as the restriction of the system, the BF setting information may not include the "extension direction" as an information element.

The "bandwidth 1" indicates a bandwidth of a first extension band. The "bandwidth 2" indicates a bandwidth of a second extension band. In the one-side setting, the "bandwidth 2" is omitted. Also in the both-side symmetric setting, the "bandwidth 2" is omitted, and two extension bands each having an extension bandwidth indicated by the "bandwidth 1" are set on both sides of the component carrier. In a certain embodiment, these "bandwidth 1" and "bandwidth 2" are an index based on the number of the resource blocks corresponding to the extension bandwidth. For example, when the extension bandwidth is 180 kHz×$N_{EB}$ ($N_{EB}$ is an integer of one or more), the "bandwidth 1" or the "bandwidth 2" can indicate $N_{EB}$. Instead, the "bandwidth 1" or the "bandwidth 2" may indicate a code mapped to $N_{EB}$, or any value calculated from $N_{EB}$. Note that the BF setting information may include the "extension direction", the "bandwidth 1" and the "bandwidth 2" for each of the downlink and the uplink.

The "guard bandwidth" indicates information indicating a bandwidth of the guard band arranged between the downlink CC and the extension band. When the bandwidth of the guard band equals to the integer multiple of the RB size, the "guard bandwidth" may be an index based on the number of the resource blocks corresponding to the guard bandwidth. Further, when the bandwidth of the guard band equals to the integer multiple of the bandwidth for each subcarrier, the "guard bandwidth" may be an index based on the number of the subcarriers corresponding to the guard bandwidth. Note that, when the terminal apparatus is not explicitly notified of the setting of the guard band, the BF setting information may not include the "guard bandwidth" as an information element.

The "channel arrangement" is channel information indicating an arrangement of one or more control channels for the non-legacy terminal. The channel information may indicate, for example, an arrangement of the PUCCH and the PRACH for the non-legacy terminal, arranged separately from the channels for the legacy terminal. Note that, when the separate control channels are not arranged for the non-legacy terminal, the BF setting information may not include such channel arrangement information.

As understood from FIG. 11, when the one-side setting is adopted, the data items of the BF setting information indicating the setting of the extension band are less than when the both-side asymmetric setting is adopted, and in comparison with the data items when the both-side symmetric setting is adopted, a 1-bit flag (the "extension direction" indicating the upper side or the lower side) is only added.

(3) Resource Assignment Information

In a certain embodiment, the base station transmits the resource assignment information generated based on the resource block numbers granted to the respective resource blocks according to the new numbering rule described above to the terminal apparatus. The channel arrangement information described using FIG. 11 is an example of the resource assignment information. Another example of the resource assignment information is the scheduling information indicating the resource blocks assigned to each terminal apparatus for data transmission.

In an example of a specification of the LTE, the scheduling information specifies a start number and the number of blocks of a set of the resource blocks to be assigned to the terminal apparatus to identify the assigned resource blocks. In such an information format, the non-legacy terminal is designed so as to handle a start number exceeding the number of the resource blocks and the number of blocks exceeding the number of the resource blocks. This allows the scheduling information for the non-legacy terminal to identify the resource blocks included in the extension band. For example, on the premise of the example of FIG. 10B, when the scheduling information indicates a start number "16" and "the number of blocks" 2, the two resource blocks in the lower end of the extension band EB41 are identified.

In another example of the specification of the LTE, the scheduling information identifies a set of the resource blocks to be assigned to the terminal apparatus by a bitmap format. In such information format, the non-legacy terminal is designed so as to handle a bitmap up to the resource block number larger than the scheduling information to be transmitted to the legacy terminal. This allows the scheduling information for the non-legacy terminal to identify the resource blocks included in the extension band. For example, on the premise of the example of FIG. 10B, the scheduling information to be transmitted to the legacy terminal is generated in a bitmap format of 16 bits in a case where the bitmap having the highest granularity is selected. On the other hand, the scheduling information to be transmitted to the non-legacy terminal is generated in a bitmap format of N bits (N>16) in the same case. Note that, in any format, the scheduling information is encoded using a terminal-specific identifier (ID) and is transmitted to each terminal apparatus.

In an example of the specification of the LTE, PRACH arrangement information indicating the arrangement of the PRACH is included in the SIB2. The PRACH is a physical channel used by the terminal apparatus to transmit the random access preamble to the base station. The random access preamble is transmitted by the terminal apparatus first connecting to the base station, the terminal apparatus recovering from a sleep mode, or the terminal apparatus accessing the target base station in a handover procedure, and, for example, is used to assume a timing offset unique to the terminal apparatus. The PRACH arrangement information includes a frequency offset indicating the arrangement in the frequency direction of the PRACH (see, for example, "3GPP TS 36.211 V11.2.0", 3GPP, February, 2013). In a certain embodiment, the base station assigns the PRACH for the non-legacy terminal to the resource blocks in the extension band, separately from the PRACH for the legacy terminal. The base station then generates the PRACH arrangement information indicating the PRACH for the non-legacy terminal, separately from the PRACH arrangement information for the legacy terminal. The PRACH arrangement information for the non-legacy terminal may indicate the frequency offset exceeding the number of the resource blocks included in the uplink CC. The non-legacy terminal is designed so as to handle such PRACH arrangement information for the non-legacy terminal. This allows the PRACH arrangement information for the non-legacy terminal to identify the resource blocks included in the extension band.

Note that, without being limited by the description here, the channel arrangement information indicating the arrangement of the channels other than the PRACH may be generated based on the resource block numbers granted to the respective resource blocks according to the new numbering rule described above.

[1-7. Suppression of Noise or Interference]

In this section, an additional system for suppressing noise or interference caused by the extension band will be described.

Figure 12:
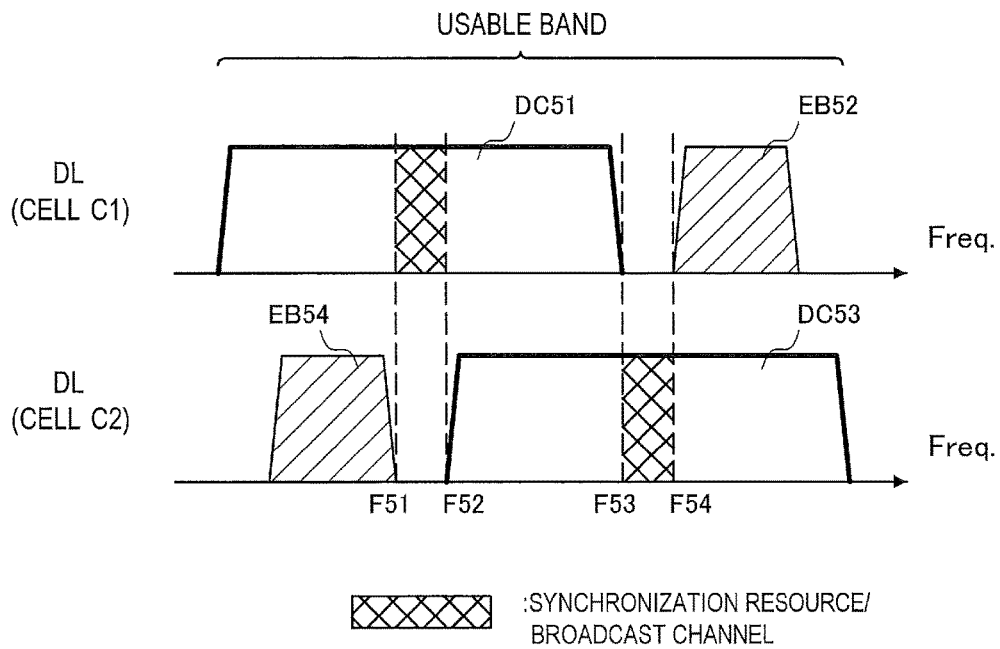
FIG. 12 is an explanatory diagram for explaining a first example of a system for suppressing noise or interference.

FIG. 12 is an explanatory diagram for explaining a first example of the system for suppressing noise or interference. In the first example, the component carrier and the extension band to be added to the component carrier are set so as to be overlapped with each other or so that the arrangement of the synchronization resource is sifted between the adjacent cells. With reference to the example of FIG. 12, while an extension band EB52 is set on the upper side of a downlink CC DC51 in a cell C1, an extension band EB54 is set on the lower side of a downlink CC DC53 in an adjacent cell C2 (that is, the positional relationship between the component carrier and the extension band is reversed). The downlink CC DC51 has the synchronization resource and the broadcast channel in a band from a center frequency from F51 to F52 in the frequency direction. The downlink CC DC53 has the synchronization resource and the broadcast channel in a band from a center frequency from F53 to F54 in the frequency direction. As a result, the arrangement of the synchronization resource and the broadcast channel is shifted between the adjacent cells. Such non-uniform setting of the extension band over the multiple cells can prevent the occurrence of the inter-cell inference in the synchronization resource and the main channels such as the broadcast channel to realize an stable operation of the system.

Figure 13:
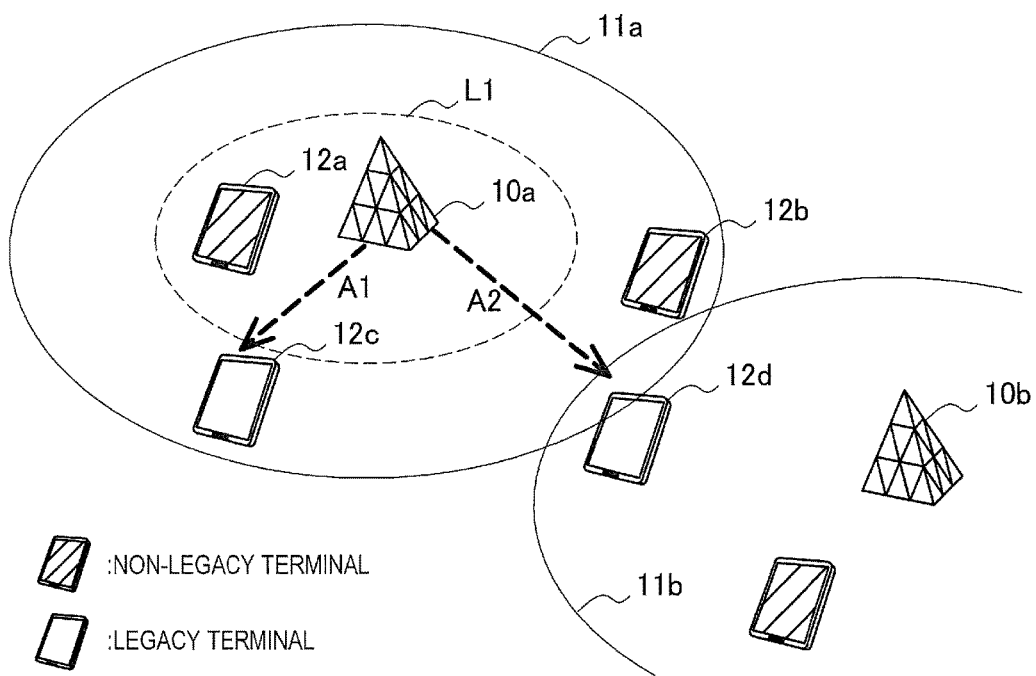
FIG. 13 is an explanatory diagram for explaining a second example of the system for suppressing noise or interference.

FIG. 13 is an explanatory diagram for explaining a second example of the system for suppressing noise or interference. In the second example, the resource blocks in the extension band in the downlink are assigned for downlink transmission by the terminal apparatus closer to the center of the cell. With reference to FIG. 13, a cell 11a operated by a base station 10a and a cell 11b operated by a base station 10b are shown. The cells 11a and 11b are adjacent to each other. The terminal apparatus 12a is the non-legacy terminal positioned inside a center region L1 of the cell 11a. The terminal apparatus 12b is the non-legacy terminal positioned around the cell edge of the cell 11a. The terminal apparatus 12c is the legacy terminal positioned in the cell 11a. The terminal apparatus 12d is the legacy terminal positioned around the cell edge of the cell 11b. In such a situation, the base station 10a preferentially assigns the resource blocks in the extension band to the terminal 12a. Since a distance between the base station 10a and the terminal apparatus 12a is relatively short, sufficient reception quality can be secured even with small transmission power in downlink transmission to the terminal apparatus 12a. With the small transmission power, the downlink transmission does not adversely affect both of the legacy terminal 12c in the serving cell 11a and the legacy terminal 12d in the adjacent cell 11b (see arrows A1 and A2). On the other hand, the base station 10a preferentially assigns the resource blocks in the downlink CC to the terminal apparatus 12b. Since a distance between the base station 10a and the terminal apparatus 12b is relatively long, high transmission power may be required in downlink transmission to the terminal apparatus 12b. With high transmission power in the extension band, the legacy terminal may recognize the downlink transmission on the extension band as noise or interference. However, when the downlink transmission is performed not on the extension band but on the downlink CC, it is possible to suppress the interference caused by the downlink transmission in a general reception circuit, or control the interference by using an existing interference control system such as a high interference indicator (HII).

An exemplary embodiment of the basic station and the terminal apparatus having some of the features described up to here will be described in detail from the next section. Note that the features described above may be combined in any form regardless of the exemplary embodiment.

<3. Configuration Example of Base Station>

In this section, an example of a configuration of a base station 100 according to an embodiment will be described. The base station 100 may be a macro cell base station or a small cell base station. A small cell is a concept including a femto cell, a nano cell, a pico cell and a micro cell. Further, a part of a function of the base station 100 described here may be implemented in the control node in the core network 16 exemplified in FIG. 1.

Figure 14:
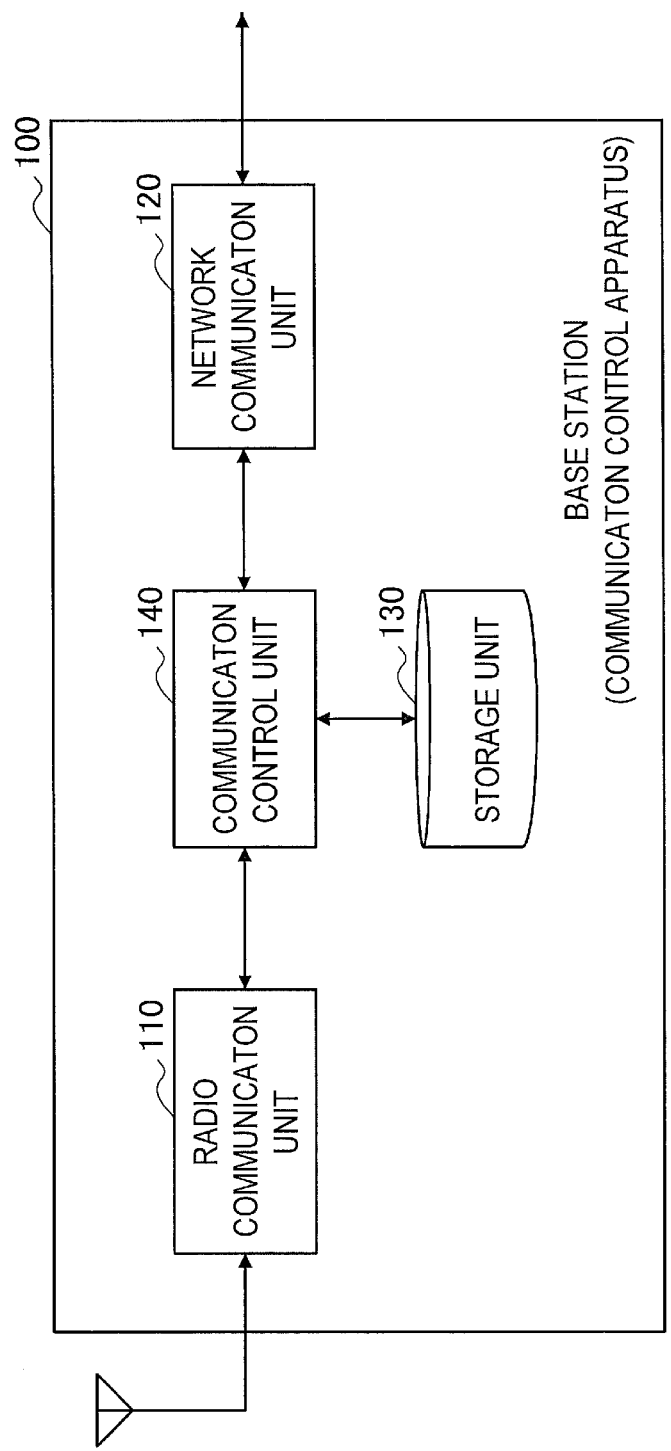
FIG. 14 is a block diagram illustrating an example of a configuration of a base station according to an embodiment.

FIG. 14 is a block diagram illustrating an example of the configuration of the base station 100. With reference to FIG. 14, the base station 100 includes a radio communication unit 110, a network communication unit 120, a storage unit 130 and a communication control unit 140.

(1) Radio Communication Unit

The radio communication unit 110 is a radio communication interface (or a radio transmitter-receiver) that executes radio communication with one or more terminal apparatuses. The radio communication unit 110 transmits and receives a radio signal on a frequency band set by the communication control unit 140 to be described later. For example, the radio communication unit 110 transmits and receives the radio signal to and from both of the legacy terminal and the non-legacy terminal on the component carrier having the basic bandwidth. Further, the radio communication unit 110 transmits and receives the radio signal to and from the non-legacy terminal on the extension band added to the component carrier.

Downlink signals transmitted by the radio communication unit 110 may include a primary synchronization signal and a secondary synchronization signal, a broadcast signal, a downlink control signal addressed to the individual terminals, and a downlink data signal. The primary synchronization signal and the secondary synchronization signal for allowing the terminal apparatus to be synchronized with the component carrier are typically transmitted on the synchronization resource arranged in 6 resource blocks in the center of the component carrier. The radio communication unit 110 then allows frame timing of the extension band to be synchronized with frame timing of the component carrier. This allows the non-legacy terminal to receive the primary synchronization signal and the secondary synchronization signal on the synchronization resource of the component carrier to also establish synchronization with the extension band.

The radio communication unit 110 may transmit the setting information related to the extension band, including the BF setting information described using FIG. 11, not on the extension band but on the component carrier. For example, the BF setting information may be broadcasted to the terminal apparatus in the MIB on the PBCH or in the SIB on the PDSCH of the component carrier. Instead, the BF setting information may be signaled to the individual terminal apparatuses on the PDCCH of the component carrier.

The radio communication unit 110 can transmit the scheduling information related to the extension band (DL assignment and UL grant) not on the extension band but on the PDCCH of the component carrier. This makes it possible to integrate the scheduling information on the component carrier and the scheduling information on the extension band into a group of information (for example, a set of a start number and the number of blocks, or a bitmap).

The radio communication unit 110 may transmit the ACK/NACK to uplink transmission on the extension band in the uplink not on the extension band but on the PHICH of the component carrier. Further, the radio communication unit 110 may transmit the ACK/NACK to downlink transmission on the extension band in the downlink not on the extension band but on the PUCCH or the PUSCH of the component carrier.

(2) Network Communication Unit

The network communication unit 120 is a communication interface connected to the core network 16 exemplified in FIG. 1. The network communication 120 relays a communication packet included in an uplink signal received by the radio communication unit 110 to the core network 16. Further, the network communication unit 120 receives a communication packet to be transmitted using the downlink signal from the core network 16. Further, the network communication unit 120 may exchange a control signal between itself and the control node (for example, the MME) on the core network 16. The network communication unit 120 may exchange the control signal via, for example, an X2 interface between itself and the base station in the adjacent cell.

(3) Storage Unit

The storage unit 130 stores a program and data for an operation of the base station 100 by using a storage medium such as a hard disk or a semiconductor memory. The data stored by the storage unit 130 may include, for example, identification information (such as a terminal ID) and capability information for each of the terminal apparatuses connected to the base station 100. The capability information indicates whether each terminal apparatus is the non-legacy terminal or the legacy terminal. Positional information (that may be dynamically updated) for each of the terminal apparatuses may be stored by the storage unit 130.

(4) Communication Control Unit

The communication control unit 140 controls the whole operation of the base station by using a processor such as a central processing unit (CPU) or a digital signal processor (DSP).

For example, the communication control unit 140 sets the component carrier (CC) having the basic bandwidth selected from 6 alternatives of 1.4 MHz, 3 MHz, 5 MHz, 10 MHz, 15 MHz and 20 MHz to a usable frequency band. In the FDD scheme, at least one downlink CC and at least one uplink CC are set. In the TDD scheme, at least one CC common to the downlink and the uplink is set. Further, the communication control unit 140 controls radio communication performed by the legacy terminal and the non-legacy terminal on the component carrier, in the resource block unit. Further, in an embodiment according to the present disclosure, the communication control unit 140, when the excess frequency band exists, sets the extension band to be added to the component carrier only to the excess frequency band either on the upper side or the lower side of the component carrier. The bandwidth of the extension band may be, for example, the integer multiple of the RB size. The extension band is added to the component carrier to extend the bandwidth of the component carrier.

The communication control unit 140, when the extension band is set, generates the BF setting information for notifying the terminal apparatus of the setting of the extension band. As described using FIG. 11, the BF setting information may include the flag for identifying the extension direction, and the bandwidth information indicating the extension bandwidth. The bandwidth information may be an index based on the number of resources corresponding to the extension bandwidth.

When radio communication is performed on the FDD scheme, the communication control unit 140 sets the guard band on which radio signals are not transmitted, to between the downlink CC and the extension band. This reduces deterioration in reception quality in the legacy terminal, caused by transmission of the downlink signal on the extension band. The communication control unit 140 may explicitly notify the terminal apparatus of the bandwidth of the guard band, for example, by including information indicating the guard bandwidth into the BF setting information. Instead, the communication control unit 140 may not explicitly notify the terminal apparatus of the bandwidth of the guard band. For example, the communication control unit 140 handles a part of the extension band as the guard band (in this case, the bandwidth of the guard band is also the integer multiple of the RB size), and prevents the radio communication unit 110 from transmitting the downlink signal on the guard band (that is, assigns no downlink transmission to the resource blocks included in the implicit guard band), to thereby realize the guard band. The communication control unit 140 may dynamically change the bandwidth of the guard band according to the reception quality reported from the terminal apparatus. On the other hand, the communication control unit 140 sets no guard band to between the uplink CC and the extension band added to the uplink CC.

Figure 15:
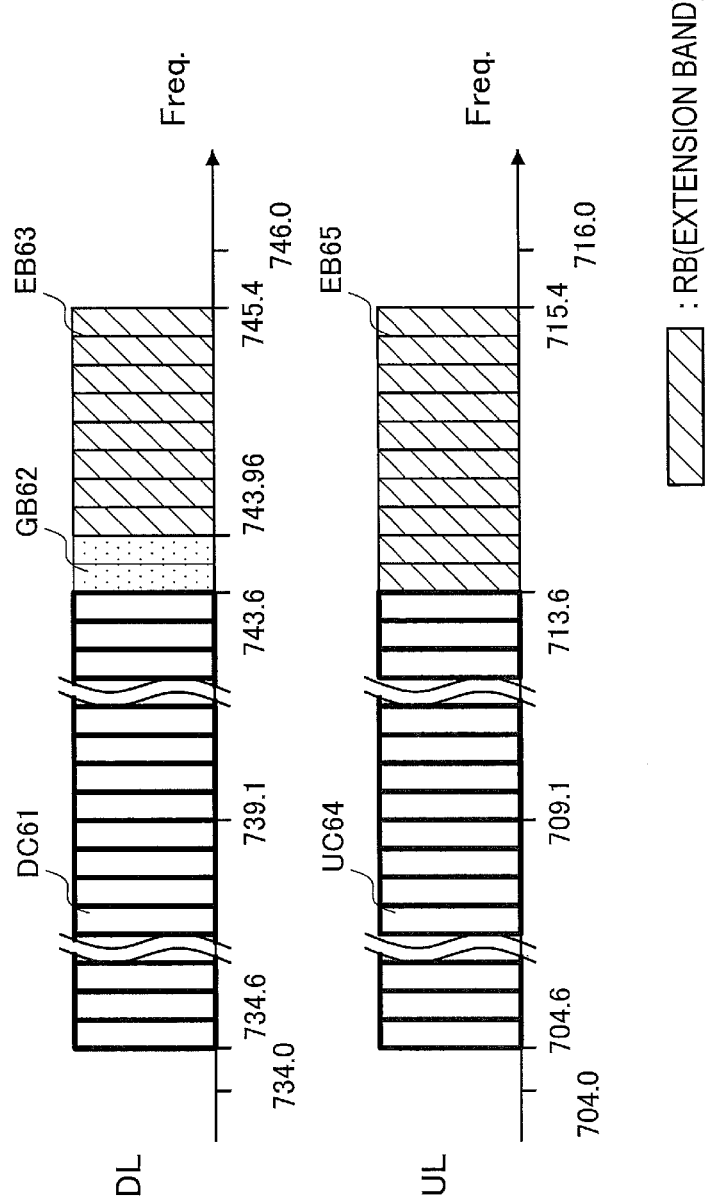
FIG. 15 is an explanatory diagram illustrating a setting example of an extension band according to an embodiment.

FIG. 15 is an explanatory diagram illustrating a setting example of the extension band set by the communication control unit 140. In this setting example, the setting pattern of the extension band is the one-side setting. The usable frequency band is 704 MHz-716 MHz and 734 MHz-746 MHz. For example, the communication control unit 140 sets a downlink CC DC61 having the basic bandwidth of 10 MHz to a band of 734.6 MHz-743.6 MHz, and sets an uplink CC UC64 having the same basic bandwidth of 10 MHz to a band of 704.6 MHz-713.6 MHz. Note that, when the basic bandwidth is 10 MHz, since channel gaps are provided on both ends of the component carrier, an effective bandwidth is 9 MHz, and the bandwidth includes 50 resource blocks in the frequency direction.

The communication control unit 140 sets an extension band EB63 to be added to the downlink CC DC61, to the excess frequency band on the upper side of the downlink CC DC61. The extension band EB63 has an extension bandwidth of 1.44 MHz (743.96 MHz-745.4 MHz), and includes 8 resource blocks in the frequency direction. A guard band GB62 having a bandwidth of 2 resource blocks is set to between the downlink CC DC61 and the extension band EB63. Further, the communication control unit 140 sets an extension band EB65 to be added to the uplink CC UC64 to the excess frequency band on the upper side of the uplink CC UC64. The extension band EB65 has an extension bandwidth of 1.8 MHz (713.6 MHz-715.4 MHz), and includes 10 resource blocks in the frequency direction. No guard band is set to between the downlink CC DC64 and the extension band EB65.

Note that the setting of the extension band shown in FIG. 15 is merely examples for description. For example, the communication control unit 140 may set the bandwidth of the component carrier, the extension band and the guard band to values different from the examples described above. Further, the communication control unit 140 may set the component carrier, the extension band and the guard band whose numbers are different from the examples described above. Further, the communication control unit 140, as described using FIG. 12, may set the component carrier and the extension band so that the positional relationship between the component carrier and the extension band in the frequency direction is reversed between the overlapping or adjacent cells.

The terminal apparatuses communicating with the base station 100 includes the non-legacy terminals supporting radio communication on the extension band (a first group of terminal apparatuses), and the legacy terminals not supporting radio communication on the extension band (a second group of terminal apparatuses). The communication control unit 140 generates the resource assignment information for the legacy terminal not depending on whether or not the extension band is set and the extension bandwidth, and allows the radio communication unit 110 to transmit the generated resource assignment information. The resource assignment information may include the channel arrangement information indicating the arrangement of the control channels such as the PRACH. Further, the resource assignment information may include the scheduling information indicating the resource blocks to be assigned to each terminal apparatus for data transmission. In the resource assignment information, the individual resource blocks are identified by using the resource block numbers uniquely granted to the respective resource blocks through the component carrier and the extension band. Then, the resource block numbers smaller than those of the resource blocks included in the extension band are granted to the resource blocks included in the component carrier. Accordingly, the risk that the legacy terminal misunderstands the meaning of the resource block numbers is solved to secure backward compatibility of the resource assignment information.

The communication control unit 140 may generate the resource assignment information for the non-legacy terminal, separately from the resource assignment information for the legacy terminal. For example, the PRACH for the non-legacy terminal may be arranged separately from the PRACH for the legacy terminal. In this case, the communication control unit 140 may allow the radio communication unit 110 to transmit the PRACH arrangement information for the non-legacy terminal, separately from the PRACH arrangement information for the legacy terminal, conveyed by the SIB2. This makes it possible to assign the PRACH for the non-legacy terminal to the extension band, and to assign more continuous resource blocks to the legacy terminal on the PUSCH.

Furthermore, the communication control unit 140 may preferentially assign transmission of the uplink control signal (for example, the ACK/NACK to downlink transmission, and a channel quality indicator (CQI)) of the non-legacy terminal to the extension band. Also in this case, since a rate of the resources used by the non-legacy terminal among the resources of the uplink CC is reduced, it is possible to assign more continuous resource blocks to the legacy terminal on the PUSCH.

Furthermore, the communication control unit 140 may generate the scheduling information for the non-legacy terminal in a format different from that of the scheduling information for the legacy terminal. As an example, the scheduling information for the non-legacy terminal is designed so as to handle a start number exceeding the number of the resource blocks included in the component carrier, and the number of the blocks exceeding the number of the resource blocks. As another example, the scheduling information for the non-legacy terminal is designed so as to handle the bitmap up to the resource block number larger than the scheduling information transmitted to the legacy terminal. This makes it possible to integrate the scheduling information on the component carrier and the scheduling information on the extension band into a group of information.

Furthermore, the communication control unit 140 may assign downlink transmission on the extension band for the non-legacy terminal closer to the center of the cell, and may assign downlink transmission on the downlink CC for the legacy terminal, and the non-legacy terminal closer to the cell edge. This can prevent large transmission power from being used on the extension band in the downlink to suppress noise or interference generated in the legacy terminal caused by the downlink signal transmitted on the extension band.

<4. Configuration Example of Terminal Apparatus>

In this section, an example of a configuration of a terminal apparatus 200 according to an embodiment will be described. The terminal apparatus 200 may be any type of a radio communication terminal, for example, a smartphone, a personal computer (PC), a personal digital assistants (PDA), a portable navigation device (PND) or a game terminal. The terminal apparatus 200 is the non-legacy terminal that supports radio communication on the extension band.

Figure 16:
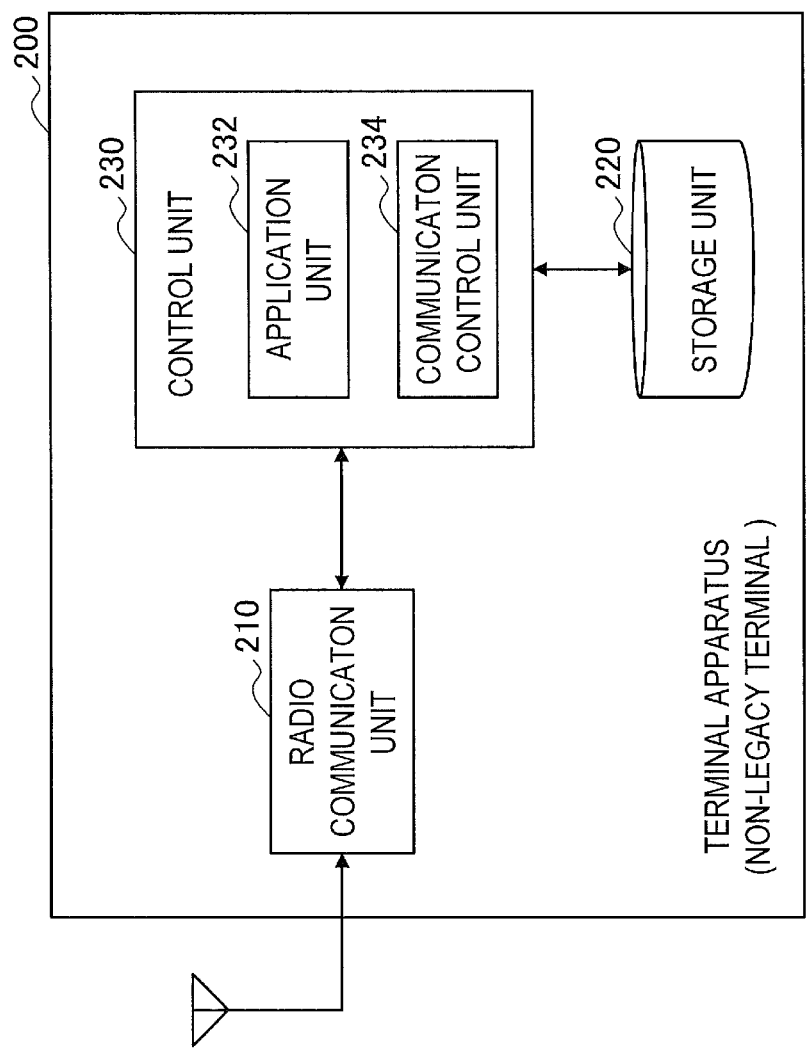
FIG. 16 is a block diagram illustrating an example of a configuration of a terminal apparatus according to an embodiment.

FIG. 16 is a block diagram illustrating an example of the configuration of the terminal apparatus 200. With reference to FIG. 16, the terminal apparatus 200 includes a radio communication unit 210, a storage unit 220, and a control unit 230.

(1) Radio Communication Unit

The radio communication unit 210 is a radio communication interface (or a radio transmitter-receiver) that executes radio communication between itself and the base station 100. The radio communication unit 210 transmits a radio signal to the base station 100 and receives a radio signal from the base station 100, on the component carrier CC having the basic bandwidth. Further, the radio communication unit 210 transmits the radio signal to the base station 100 and receives the radio signal from the base station 100, on the extension band according to control by a communication control unit 234 to be described later. For example, the radio communication unit 210 establishes synchronization with the downlink CC by detecting the primary synchronization signal and the secondary synchronization signal transmitted from the base station 100. When the extension band is set by the base station 100, frame timing of the extension band is synchronized with frame timing of the component carrier. Therefore, in this case, the radio communication unit 210 can also establish synchronization with the extension band as well as the downlink CC.

The radio communication unit 210 receives the broadcast information transmitted on the PBCH of the downlink CC. The broadcast information may include, for example, the bandwidth information indicating the basic bandwidth of the component carrier. The radio communication unit 210 further receives the BF setting information indicating the setting related to the extension band. For example, the radio communication unit 210 may receive the BF setting information in the MIB on the PBCH, in the SIB on the PDSCH, or in the individual signaling on the PDCCH. Parameters of the radio communication unit 210 depending on the band are set according to some indexes included in the BF setting information.

Figure 17:
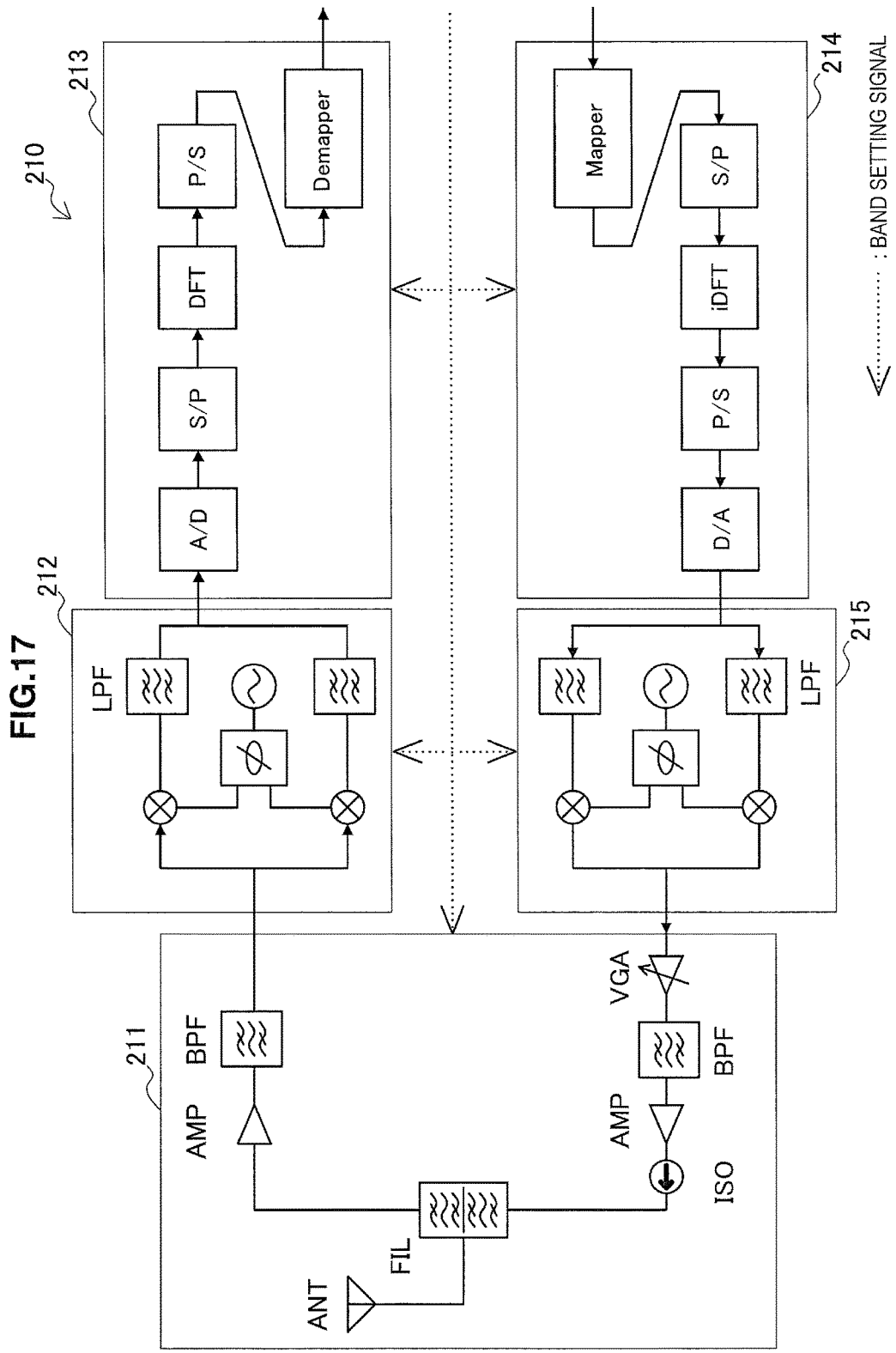
FIG. 17 is a block diagram illustrating an example of a detailed configuration of a radio communication unit shown in FIG. 16.

FIG. 17 is a block diagram illustrating an example of the detailed configuration of the radio communication unit 210 shown in FIG. 16. With reference to FIG. 17, the radio communication unit 210 has a front end 211, an orthogonal demodulation unit 212, a reception baseband unit 213, a transmission baseband unit 214, and an orthogonal modulation unit 215.

The front end 211 includes one or more transmission/reception antennas (ANTs); a filter (FIL); an amplifier (AMP) and a band-pass filter (BPF) in a reception branch; and a valuable gain amplifier (VGA), a band-pass filter (BPF), an amplifier (AMP), and an isolator (ISO) in a transmission branch.

The orthogonal demodulation unit 212 decomposes a reception signal inputted from the front end 211 into an I component and a Q component by a frequency adjusted by a frequency synthesizer, and filters the I component and the Q component by a low-pass filter (LPF). The low-pass filter removes out-of-band noise, and aliasing noise that may be generated by AD conversion.

The reception baseband unit 213 includes an analog-digital converter (A/D), a serial-parallel converter (S/P), a discrete Fourier transformer (DFT), a parallel-serial converter (P/S), and a demapper. The analog-digital converter converts a received analog signal into a digital signal at a sampling rate corresponding to a reception band. The discrete Fourier transformer converts a digital signal in a frequency domain for each subcarrier, inputted from the serial-parallel converter, into a digital signal in a time domain.

The transmission baseband unit 214 includes a mapper, a serial-parallel converter (S/P), an inverse discrete Fourier transformer (iDFT), a parallel-serial converter (P/S), and a digital-analog converter (D/A). The inverse discrete Fourier transformer converts a digital signal in a time domain for each subcarrier, inputted from the serial-parallel converter, into a digital signal in a frequency domain. The digital-analog converter converts a digital signal into a transmission analog signal at a sampling rate corresponding to a transmission band.

The orthogonal modulation unit 215 filters an I component and a Q component of the transmission analog signal inputted from the transmission baseband unit 214 by a low-pass filter (LPF), and modulates the filtered signal into a transmission signal having a radio frequency by a frequency adjusted by the frequency synthesizer. The transmission signal generated by the orthogonal modulation unit 215 is then outputted to the front end 211.

For example, the cut-off frequency of the low-pass filter exemplified in FIG. 17, the sampling rate of the A/D conversion and the D/A conversion, and the FFT size of the DFT and the inverse DFT are circuit parameters to be adjusted depending on the transmission/reception band (and the bandwidth thereof). These circuit parameters may be set according to a band setting signal generated by the communication control unit 234 to be described later on the basis of the indexes included in the BF setting information. As a result, the radio communication unit 210 can transmit and receive a radio signal on the extension band.

(2) Storage Unit

The storage unit 220 stores a program and data for operating the terminal apparatus 200 by using a storage medium such as a hard disk or a semiconductor memory. The data stored by the storage unit 220 may include, for example, the bandwidth information indicating the basic bandwidth, and the BF setting information.

(3) Control Unit

The control unit 230 controls the whole operation of the terminal apparatus 200 by using a processor such as a CPU or a DSP. In an embodiment according to the present disclosure, the control unit 230 has an application unit 232, and the communication control unit 234.

The application unit 232 mounts an application in an upper layer thereon. The application unit 232 generates data traffic to be transmitted to another apparatus, and outputs the generated data traffic to the radio communication unit 210. Further, the application unit 232 processes the data traffic received by the radio communication unit 210 from another apparatus.

The communication control unit 234 controls radio communication executed by the radio communication unit 210 according to a control signal received from the base station 100. The radio communication between the terminal apparatus 200 and the base station 100 is typically controlled in the resource block unit. For example, the communication control unit 234 sets the circuit parameters of the radio communication unit 210 depending on the band so as to be fitted to the basic bandwidth indicated by the broadcast information received by the radio communication unit 210. This allows the radio communication unit 210 to transmit and receive a radio signal on the component carrier.

Furthermore, the communication control unit 234, when the extension band is set to the excess frequency band by the base station 100, resets (adjusts) the circuit parameters of the radio communication unit 210 depending on the band so as to be fitted to the extension bandwidth indicated by the BF setting information received by the radio communication unit 210. This allows the radio communication unit 210 to transmit and receive a radio signal on the extension band in addition to the component carrier. When the extension band is set so as to have the extension bandwidth of the integer multiple of the size of the RB, the BF setting information received by the radio communication unit 210 can express the extension bandwidth with a small number of bits on the basis of the number of the resource blocks corresponding to the extension band width. The BF setting information may include a flag indicating whether the extension band is set on the upper side or the lower side of the component carrier.

Furthermore, the communication control unit 234 allows the radio communication unit 210 to execute radio communication according to the resource assignment information received by the radio communication unit 210. The resource assignment information may include the channel arrangement information indicating the arrangement of the control channels such as the PRACH. For example, the radio communication unit 210 is connected to the base station 100 by transmitting the random access signal to the base station 100 on the PRACH for the legacy terminal indicated by the channel assignment information. The PRACH for the non-legacy terminal, unlike the PRACH for the legacy terminal reported in the SIB2, may be assigned to the resource blocks in the extension band. Further, the radio communication unit 210 may transmit the uplink control signals such as the ACK/NACK to downlink transmission, and the CQI to the base station 100 on the PUCCH indicated by the channel assignment information.

Furthermore, the resource assignment information may include the scheduling information indicating the resource blocks assigned to the terminal apparatus 200 for data transmission. For example, the radio communication unit 210 receives the downlink signal or transmits the uplink signal in the resource blocks indicated by the scheduling information.

When the extension band is set, the resource assignment information described above is generated based on the resource block numbers uniquely granted to the respective resource blocks through the component carrier and the extension band. The resource block numbers smaller than those of the resource blocks included in the extension band are granted to the resource blocks included in the component carrier. Therefore, a format of the resource assignment information received by the terminal apparatus 200 as the non-legacy terminal may be different depending on whether or not the extension band is set. For example, when the extension band is not set, the maximum value of the resource block numbers that may be identified by the resource assignment information corresponds to the number of the resource blocks of the component carrier. In contrast, when the extension band is set, the maximum value of the resource block numbers that may be identified by the resource assignment information corresponds to the sum of the number of the resource blocks of the component carrier and the number of the resource blocks of the extension band (that may include the guard band). Further, the size of the scheduling information expressed in a bitmap format when the extension band is set, becomes large than the size when the extension band is not set. The communication control unit 234 interprets these pieces of resource assignment information according to the setting of the extension band, and controls radio communication executed by the radio communication unit 210.

Note that a format of the resource assignment information received by the legacy terminal is not changed depending whether or not the extension band is set, as a result of the adoption of the new numbering rule described above.

<5. Flow of Processing>

In this section, a flow of processing in a radio communication system including the base station 100 and the terminal apparatus 200 will be described using FIG. 18 to FIG. 20.

[5-1. Band Setting Processing]

Figure 18:
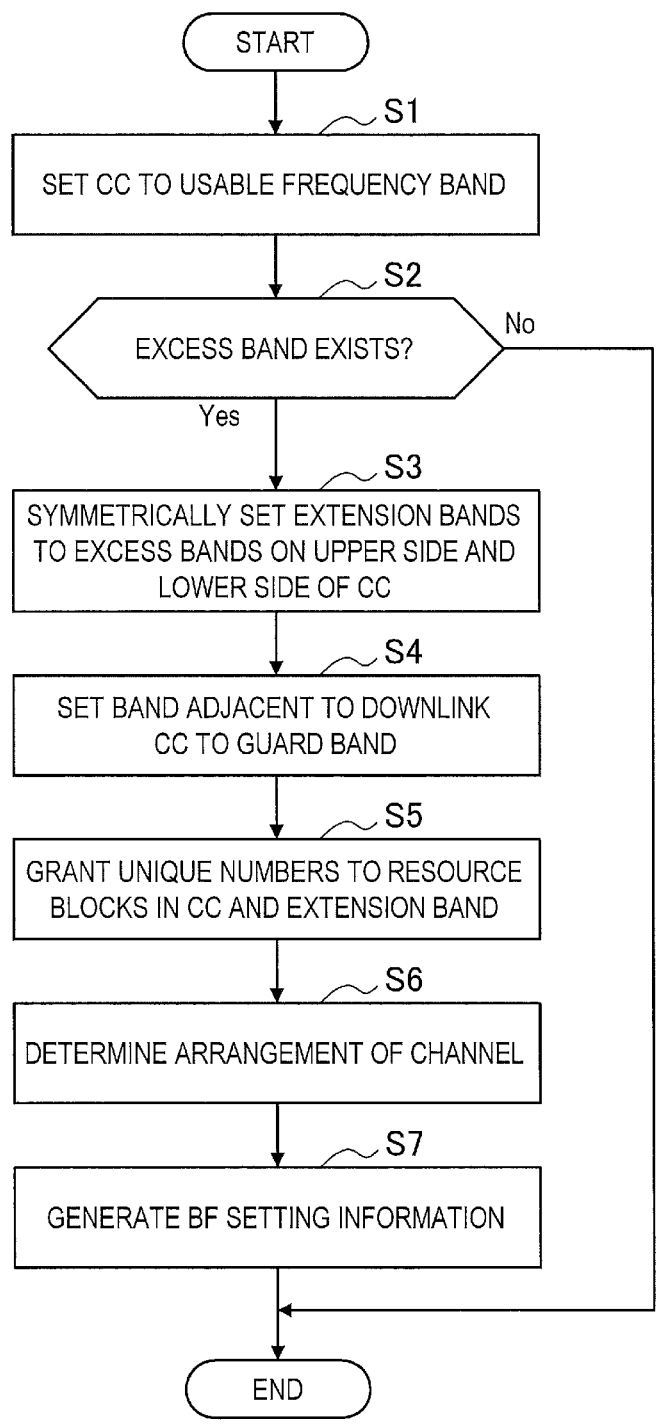
FIG. 18 is a flow chart illustrating an example of a flow of band setting processing according to an embodiment.

FIG. 18 is a flow chart illustrating an example of a flow of band setting processing executed by the base station 100.

With reference to FIG. 18, first, the communication control unit 140 of the base station 100 sets the one or more component carriers in the usable frequency band (Step S1). Next, the communication control unit 140 determines whether or not the excess frequency band exists (Step S2). When the excess frequency band does not exist, the subsequent processing shown in FIG. 18 is skipped. When the excess frequency band exists, the processing proceeds to Step S3.

At Step S3, the communication control unit 140 sets the extension band to the excess frequency band on the upper side or the lower side of the component carrier (Step S3). The extension band set here is added to the component carrier to extend the basic bandwidth of the component carrier. Next, the communication control unit 140 sets the band adjacent to the downlink CC to the guard band (Step S4). The guard band may be handled as a part of the extension band. Next, the communication control unit 140 grants the unique resource block numbers to the resource blocks in the component carrier and the extension band added to the component carrier according to the new numbering rule (Step S5). Next, the communication control unit 140 determines the arrangement of some channels (Step S6). For example, the synchronization resource and the broadcast channel are arranged in the resource blocks in the center of the downlink CC. The PRACH for the legacy terminal is arranged in a part of the PUSCH of the uplink CC. The PRACH for the non-legacy terminal is arranged in the extension band in the uplink. Next, the communication control unit 140 generates the BF setting information including the index indicating the setting of the extension band (Step S7).

The band setting processing described here may be executed when the base station 100 initializes the operation of the cell, or may be executed during the operation (for example, periodically) in order to dynamically update the setting of the extension band.

[5-2. Communication Control Processing]

Figure 19A:
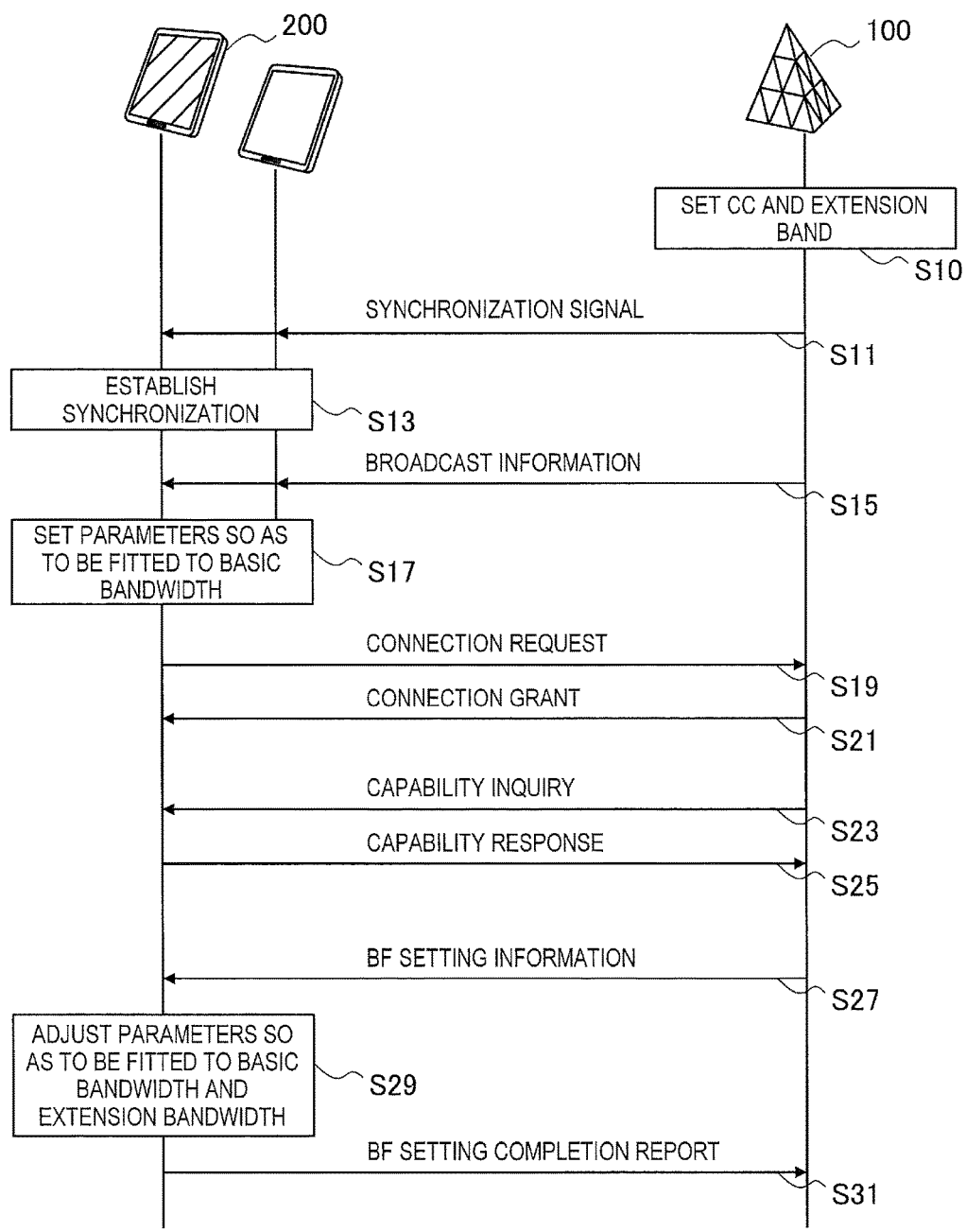
FIG. 19A is a first half of a sequence diagram illustrating an example of a flow of communication control processing according to an embodiment.
Figure 19B:
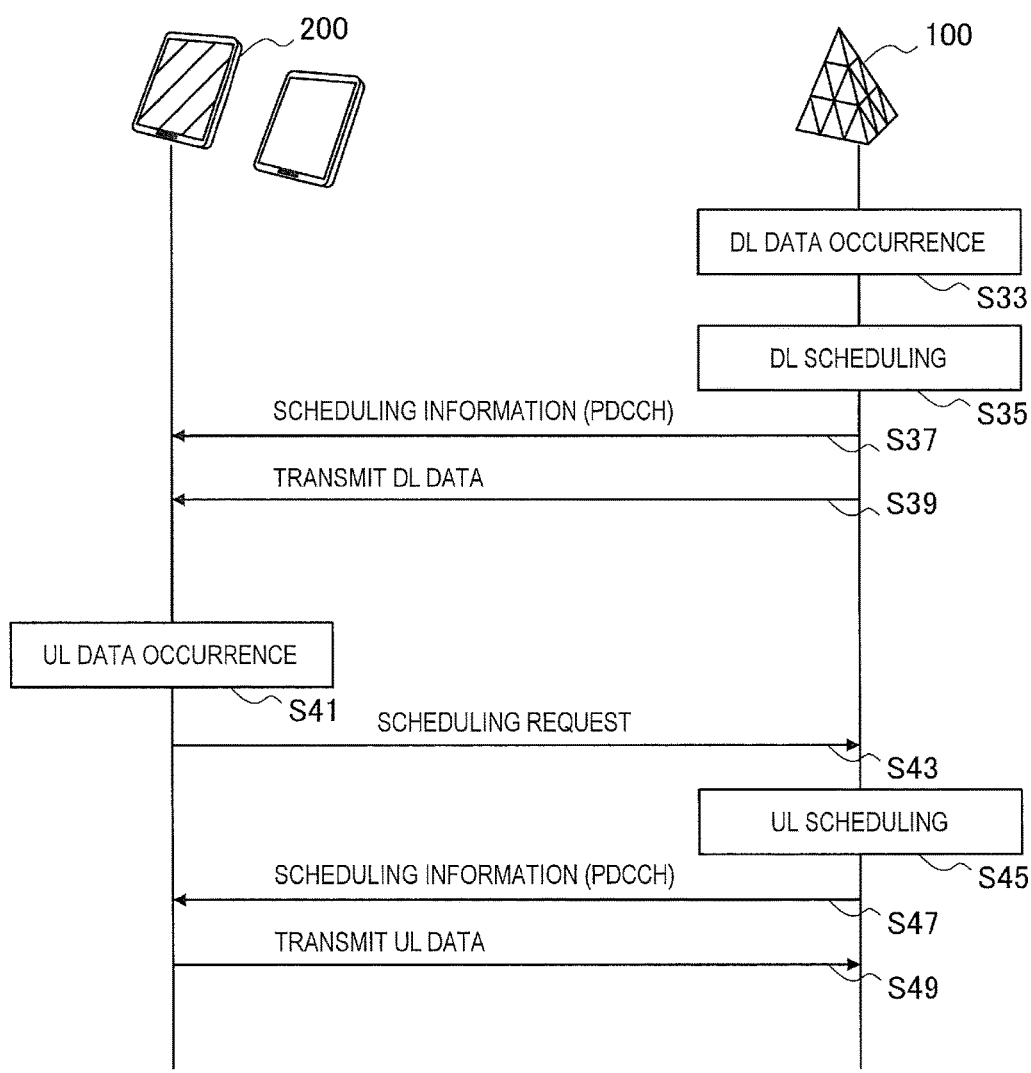
FIG. 19B is a second half of the sequence diagram illustrating the example of the flow of the communication control processing according to an embodiment.

FIG. 19A and FIG. 19B are a sequence diagram illustrating an example of a flow of communication control processing according to an embodiment.

With reference to FIG. 19A, first, the base station 100 sets the one or more component carriers and the one or more extension bands to the usable frequency band by executing the band setting processing described using FIG. 18 (Step S10).

Next, the base station 100 transmits the primary synchronization signal and the secondary synchronization signal on the synchronization resource arranged in the resource blocks in the center of the downlink CC (Step S11). The terminal apparatus 200 as the non-legacy terminal establishes synchronization with the base station 100 by receiving such synchronization signals (Step S13).

Next, the base station 100 transmits the broadcast information including the bandwidth information indicating the basic bandwidth on the broadcast channel of the downlink CC (Step S15). The communication control unit 234 of the terminal apparatus 200 sets the circuit parameters of the radio communication unit 210 depending on the band so as to be fitted to the basic bandwidth indicated by the received broadcast information (Step S17). Note that the legacy terminal also receives these synchronization signals and the broadcast information from the base station 100.

When the circuit parameters of the radio communication unit 210 are set so as to be fitted to the basic bandwidth in the terminal apparatus 200, it is possible to transmit and receive the radio signal on the component carrier. Next, the terminal apparatus 200 transmits a connection request to the base station 100 on the uplink CC (Step S19). The base station 100 transmits connection grant to the terminal apparatus 200 in response to the connection request from the terminal apparatus 200 (Step S21).

Next, the base station 100 transmits an inquiry signal for inquiring capability of the terminal apparatus 200 to the terminal apparatus 200 on the downlink CC (Step S23). The terminal apparatus 200 transmits a capability response to the base station 100 in response to the inquiry signal from the base station 100 (Step S25). The capability response transmitted here includes capability information indicating that the terminal apparatus 200 is the non-legacy terminal, that is, it supports radio communication on the extension band.

Next, the base station 100 transmits the BF setting information including the index indicating the setting of the extension band to the terminal apparatus 200 (Step S27). The communication control unit 234 of the terminal apparatus 200 adjusts the circuit parameters of the radio communication unit 210 depending on the band so as to be fitted to the extension bandwidth (or the sum of the basic bandwidth and the extension bandwidth) indicated by the received BF setting information (Step S29). The terminal apparatus 200 then transmits a BF setting completion report to the base station 100 (Step S31).

After that, the sequence moves to FIG. 19B. When the downlink data addressed to the terminal apparatus 200 occurs (Step S33), the base station 100 assigns the downlink transmission to the terminal apparatus 200 to the resource blocks in the downlink CC or the extension band added to the downlink CC (Step S35). Next, the base station 100 transmits the scheduling information indicating the downlink assignment, for example, to the terminal apparatus 200 on the PDCCH of the downlink CC (Step S37). The base station 100 then transmits the downlink data to the terminal apparatus 200 by using the assigned resource blocks (Step S39).

Furthermore, when the uplink data addressed to another apparatus occurs (Step S41), the terminal apparatus 200 transmits a scheduling request to the base station 100 (Step S43). The base station 100 assigns the uplink transmission from the terminal apparatus 200 to the resource blocks in the uplink CC or the extension band added to the uplink CC in response to the reception of the scheduling request (Step S45). Next, the base station 100 transmits the scheduling information indicating the uplink grant to the terminal apparatus 200, for example, on the PDCCH of the downlink CC (Step S47). The terminal apparatus 200 then transmits the uplink data to the base station 100 by using the assigned resource blocks (Step S49).

Note that there has been described here the example that, after the base station 100 has confirmed the capability of the terminal apparatus 200, the base station 100 transmits the BF setting information to the terminal apparatus 200. However, the base station 100 may broadcast the BF setting information into the cell before confirming the capability of the terminal apparatus 200.

[5-3. Scheduling Processing]

Figure 20:
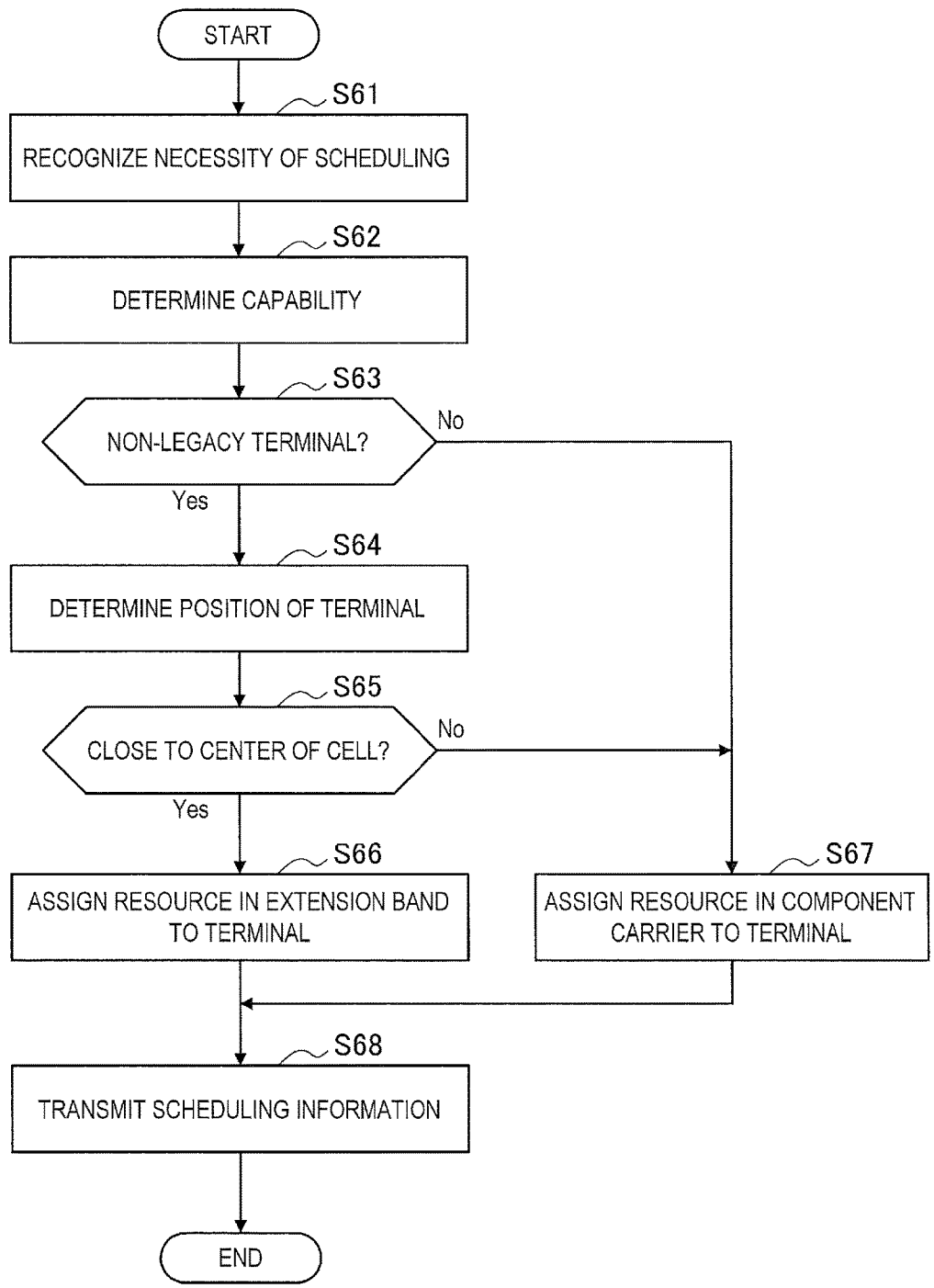
FIG. 20 is a flow chart illustrating an example of a flow of scheduling processing according to an embodiment.

FIG. 20 is a flow chart illustrating an example of a flow of scheduling processing according to an embodiment.

With reference to FIG. 20, first, the communication control unit 140 of the base station 100 recognizes the necessity of the scheduling (Step S61). For example, the communication control unit 140 may recognize the necessity of the scheduling by recognizing that the downlink data addressed to a certain terminal apparatus has been delivered, or by receiving the scheduling request for the uplink data from the terminal apparatus.

The communication control unit 140 that has recognized the necessity of the scheduling for a certain terminal, determines the capability of the terminal apparatus (Step S62). The capability information of each terminal apparatus may be acquired in advance through the response to the capability inquiry, and may be stored by the storage 130 of the base station 100.

When the terminal apparatus is the non-legacy terminal, the communication control unit 140 further determines the position of the non-legacy terminal (Step S64). For example, the position of the terminal may be measured using a GPS signal in the terminal and reported to the base station 100, or may be measured in the base station 100.

The communication control unit 140, when the determined position is close to the center of the cell (for example, the distance from the base station 100 is below a predetermined value), assigns the resource blocks in the extension band to the non-legacy terminal (Step S66). On the other hand, the communication control unit 140, when the determined position is close to the cell edge, assigns the resource blocks in the component carrier to the non-legacy terminal (Step S67). Note that, for the uplink, Step S64 and Step S65 may be omitted. In this case, the uplink transmission of the non-legacy terminal is assigned preferentially to the resource blocks in the extension band.

Furthermore, when the terminal apparatus is the legacy terminal, the communication control unit 140 assigns the resource blocks in the component carrier to the legacy terminal (Step S67).

The communication control unit 140 generates the scheduling information indicating the result of the scheduling, and allows the radio communication unit 110 to transmit the generated scheduling information (Step S68). The format of the scheduling information for the non-legacy terminal may be different from the format of the scheduling information for the legacy terminal.

Note that the flow of the processing described using FIG. 18 to FIG. 20 is merely an example. The order of the processing steps may be changed, and the processing steps may be partially omitted, or an additional processing step may be introduced.

<6. Summary>

Up to here, the embodiments of the technology according to the disclosure have been described in detail. According to the embodiments described above, the extension band to be added to the component carrier is set only to the excess frequency band either on the upper side or the lower side of the component carrier having the basic bandwidth. Therefore, for example, in the downlink, when one guard band is set to between the component carrier and the extension band, it is possible to avoid deterioration in reception quality in the legacy terminal. This makes it possible to realize the appropriate balance between the avoidance of the deterioration in reception quality and the resource utilization efficiency. Further, in the uplink, securing the wide and continuous bandwidth as much as possible for the extension band allows the non-legacy terminal to perform uplink transmission with excellent power efficiency.

Furthermore, in a certain embodiment, the synchronization resource on which the synchronization signal for synchronizing the non-legacy terminal with both of the component carrier and the extension band is transmitted, is assigned to the center of the downlink CC. The arrangement of the synchronization resource is similar to the arrangement when the extension band is not set. Therefore, the cell search procedure of the legacy terminal is not affected by whether or not the extension band is set. Further, since the synchronization resource may not be arranged in the extension band having the relatively narrow bandwidth, it is possible to avoid an increase in rate of the overhead of the resource. The broadcast channel may be also assigned to the center of the downlink CC.

Furthermore, in a certain embodiment, when the positional relationship between the component carrier and the extension band in the frequency direction is set in a manner that the positional relationship is reversed between the overlapping or adjacent cells, it is also possible to suppress the inter-cell interference caused by transmission on the extension band.

Note that a series of control processing by each apparatus described in this specification may be achieved by using any of software, hardware, and a combination of software and hardware. A program constituting software is stored in a storage medium (non-transitory media) in advance, the medium being provided in the inside or outside of each apparatus, for example. When each program is executed, for example, the program is read by random access memory (RAM) and executed by a processor such as a CPU.

The preferred embodiments of the present disclosure have been described above in detail with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)

A communication control apparatus including:

a communication control unit that controls radio communication performed by one or more terminal apparatuses on a component carrier having a basic bandwidth, wherein the communication control unit sets an extension band to be added to the component carrier only to an excess frequency band either on an upper side or a lower side of the component carrier.

(2)

The communication control apparatus according to (1), wherein the radio communication is performed by a frequency division duplex (FDD) scheme, wherein the component carrier is a downlink component carrier, and wherein the communication control unit sets a guard band on which a radio signal is not transmitted, to between the downlink component carrier and the extension band.

(3)

The communication control apparatus according to (2), wherein the communication control unit does not set the guard band to between an uplink component carrier and an extension band added to the uplink component carrier.

(4)

The communication control apparatus according to any one of (1) to (3), wherein the communication control unit assigns a resource on which a synchronization signal for synchronizing the terminal apparatus with both of the component carrier and the extension band is transmitted, to a center of the component carrier.

(5)

The communication control apparatus according to any one of (1) to (4), wherein the communication control unit controls the radio communication in a resource block unit, and sets a bandwidth of the extension band to an integer multiple of a size of a resource block.

(6)

The communication control apparatus according to (5), wherein the communication control unit uses an index based on the number of resource blocks corresponding to the bandwidth of the extension band to notify the terminal apparatus of the setting of the extension band.

(7)

The communication control apparatus according to (4), wherein the communication control unit sets the component carrier and the extension band in a manner that a positional relationship between the component carrier and the extension band in a frequency direction is reversed between overlapping or adjacent cells.

(8)

The communication control apparatus according to any one of (1) to (7), further including:

a radio communication unit that transmits setting information related to the extension band on the component carrier.

(9)

The communication control apparatus according to any one of (1) to (8), further including:

a radio communication unit that transmits scheduling information related to the extension band on the component carrier to the terminal apparatus.

(10)

The communication control apparatus according to any one of (1) to (9), wherein the one or more terminal apparatuses include a first group of terminal apparatuses that support radio communication on the extension band, and a second group of terminal apparatuses that do not support the radio communication on the extension band, and wherein the communication control unit transmits resource assignment information that is not changed depending on whether or not the extension band is set, for the second group of terminal apparatuses.

(11)

The communication control apparatus according to (10), wherein the resource assignment information is generated based on resource block numbers uniquely granted to respective resource blocks through the component carrier and the extension band, and wherein the resource block numbers smaller than the resource block numbers of the resource blocks included in the extension band are granted to the resource blocks included in the component carrier regardless of whether the extension band is set to either the upper side or the lower side of the component carrier.

(12)

The communication control apparatus according to (10) or (11), wherein the resource assignment information includes at least one of scheduling information and channel arrangement information transmitted on the component carrier.

(13)

The communication control apparatus according to (1), wherein the radio communication is performed by a frequency division duplex (FDD) scheme, and wherein the component carrier is an uplink component carrier.

(14)

The communication control apparatus according to (13), wherein the communication control unit preferentially assigns transmission of a non-data signal in an uplink of a first group of terminal apparatuses that support the radio communication on the extension band, to the extension band.

(15)

The communication control apparatus according to (14), wherein the non-data signal is an random access signal.

(16)

The communication control apparatus according to (15), wherein the communication control unit assigns a first random access channel for the first group of terminal apparatuses to resource blocks in the extension band, and assigns a second random access channel for a second group of terminal apparatuses that do not support the radio communication on the extension band, to resource blocks in the component carrier.

(17)

A communication control method including:

controlling radio communication performed by one or more terminal apparatuses on a component carrier having a basic bandwidth; and setting an extension band to be added to the component carrier only to an excess frequency band either on an upper side or a lower side of the component carrier.

(18)

A radio communication system including:
one or more terminal apparatuses; and
a communication control apparatus,
wherein the communication control apparatus sets an extension band to be added to the component carrier only to an excess frequency band either on an upper side or a lower side of the component carrier having a basic bandwidth, and
wherein at least one of the terminal apparatuses executes radio communication on the extension band.

(19)

A terminal apparatus including:
a radio communication unit that communicates with a communication control apparatus controlling radio communication performed on a component carrier having a basic bandwidth, the communication control apparatus setting an extension band to be added to the component carrier only to an excess frequency band either on an upper side or a lower side of the component carrier; and
a control unit that, when the extension band is set by the communication control apparatus, allows the radio communication unit to execute the radio communication on the set extension band.

(20)

The terminal apparatus according to (19),
wherein the control unit sets a parameter of the radio communication unit depending on a band according to an index indicating the setting of the extension band received from the communication control apparatus, and
wherein the index indicates whether the extension band is set to either the upper side or the lower side of the component carrier.

REFERENCE SIGNS LIST 100 communication control apparatus (base station)
110 radio communication unit
140 communication control unit
200 terminal apparatus (non-legacy terminal)
210 radio communication unit
234 communication control unit

The invention claimed is:

1. A communication control apparatus, comprising:
one or more processors configured to:
control radio communication performed by one or more terminal apparatuses on a component carrier having a determined bandwidth;
set an extension band to add to the component carrier, wherein the extension band is added to an excess frequency band in at least one of an upper side or a lower side of the component carrier; and
set a guard band between the component carrier and the extension band based on the component carrier, wherein a bandwidth of the guard band is changed based on a reception quality indicated from at least one terminal apparatus of the one or more terminal apparatuses.

2. The communication control apparatus according to claim 1, wherein the radio communication is performed by a frequency division duplex (FDD) scheme, wherein the component carrier is a downlink component carrier, and wherein the one or more processors are further configured to set the guard band on which a radio signal is not transmitted, to between the downlink component carrier and the extension band.

3. The communication control apparatus according to claim 1, wherein based on a determination that the component carrier is an uplink component carrier, the guard band is absent between the uplink component carrier and an extension band added to the uplink component carrier.

4. The communication control apparatus according to claim 1, wherein the one or more processors are further configured to assign a resource on which a synchronization signal to synchronize the at least one terminal apparatus with both of the component carrier and the extension band is transmitted, wherein the resource is assigned to a center of the component carrier.

5. The communication control apparatus according to claim 1, wherein the one or more processors are further configured to control the radio communication in a resource block unit, and set a bandwidth of the extension band to an integer multiple of a size of a resource block.

6. The communication control apparatus according to claim 5, wherein the one or more processors are further configured to use an index based on a number of resource blocks corresponding to the bandwidth of the extension band, wherein the index is used to notify the at least one terminal apparatus that the extension band is set.

7. The communication control apparatus according to claim 4, wherein the one or more processors are further configured to set the component carrier and the extension band such that that a positional relationship between the component carrier and the extension band in a frequency direction is reversed between overlapping or adjacent cells.

8. The communication control apparatus according to claim 1, further comprising: a radio communication interface configured to transmit setting information related to the extension band on the component carrier.

9. The communication control apparatus according to claim 1, further comprising:
a radio communication interface configured to transmit scheduling information related to the extension band on the component carrier to the at least one terminal apparatus.

10. The communication control apparatus according to claim 1,
wherein the one or more terminal apparatuses include a first group of terminal apparatuses that support radio communication on the extension band, and a second group of terminal apparatuses in which the radio communication on the extension band is unsupported, and
wherein the one or more processors are further configured to transmit resource assignment information for the second group of terminal apparatuses, wherein the resource assignment information is unchanged based on whether the extension band is set.

11. The communication control apparatus according to claim 10,
wherein the resource assignment information is generated based on resource block numbers uniquely granted to respective resource blocks via the component carrier and the extension band, and
wherein the resource block numbers smaller than the resource block numbers of the resource blocks included in the extension band are granted to the resource blocks included in the component carrier regardless of whether the extension band is set to either the upper side or the lower side of the component carrier.

12. The communication control apparatus according to claim 10,
wherein the resource assignment information includes at least one of scheduling information or channel arrangement information transmitted on the component carrier.

13. The communication control apparatus according to claim 1,
wherein the radio communication is performed by a frequency division duplex (FDD) scheme, and
wherein the component carrier is an uplink component carrier.

14. The communication control apparatus according to claim 13,
wherein the one or more processors are further configured to assign to the extension band, transmission of a non-data signal in an uplink of a first group of terminal apparatuses that support the radio communication on the extension band.

15. The communication control apparatus according to claim 14, wherein the non-data signal is a random access signal.

16. The communication control apparatus according to claim 15,
wherein the one or more processors are further configured to assign a first random access channel for the first group of terminal apparatuses to resource blocks in the extension band, and assign a second random access channel for a second group of terminal apparatuses in which the radio communication is unsupported on the extension band, wherein the second random access channel is assigned to resource blocks in the component carrier.

17. A communication control method, comprising:
controlling radio communication performed by one or more terminal apparatuses on a component carrier having a determined bandwidth;
setting an extension band to add to the component carrier, wherein the extension band is added to an excess frequency band in at least one of an upper side or a lower side of the component carrier; and
setting a guard band between the component carrier and the extension band based on the component carrier, wherein a bandwidth of the guard band is changed based on a reception quality indicated from at least one terminal apparatus of the one or more terminal apparatuses.

18. A communication control apparatus, comprising:
one or more processors configured to:
control radio communication performed by one or more terminal apparatuses on a component carrier having a basic bandwidth;
set an extension band to add to the component carrier, wherein the extension band is added to an excess frequency band in at least one of an upper side or a lower side of the component carrier; and
assign a resource on which a synchronization signal to synchronize at least one terminal apparatus with both of the component carrier and the extension band is transmitted, wherein the resource is assigned to a center of the component carrier.

* * * * *